US008458746B2

(12) United States Patent
Chang et al.

(10) Patent No.: US 8,458,746 B2
(45) Date of Patent: Jun. 4, 2013

(54) META CHANNEL CACHING AND INSTANT VIEWING RELATED TECHNOLOGY

(75) Inventors: Jack H. Chang, Saratoga, CA (US); William H. Sheu, Fremont, CA (US); Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 985 days.

(21) Appl. No.: 12/366,337

(22) Filed: Feb. 5, 2009

(65) Prior Publication Data
US 2010/0199311 A1 Aug. 5, 2010

(51) Int. Cl.
*H04N 5/445* (2011.01)
(52) U.S. Cl.
USPC ............................................ 725/46; 725/131
(58) Field of Classification Search
USPC .............. 725/39, 46, 131, 67, 91, 93, 94, 114, 725/116, 144, 146
See application file for complete search history.

(56) References Cited

U.S. PATENT DOCUMENTS

| | | | |
|---|---|---|---|
| 5,801,787 A | 9/1998 | Schein et al. | |
| 6,505,348 B1 | 1/2003 | Knowles et al. | |
| 6,523,696 B1 | 2/2003 | Saito et al. | |
| 6,601,237 B1 | 7/2003 | Ten Kate et al. | |
| 6,642,938 B1 * | 11/2003 | Gilboy | 715/721 |
| 7,089,579 B1 | 8/2006 | Mao et al. | |
| 7,225,456 B2 | 5/2007 | Kitsukawa et al. | |
| 7,346,649 B1 | 3/2008 | Wong | |
| 7,360,160 B2 | 4/2008 | Matz | |
| 7,773,860 B2 * | 8/2010 | Wood et al. | 386/296 |
| 7,987,491 B2 * | 7/2011 | Reisman | 725/112 |
| 2002/0184634 A1 | 12/2002 | Cooper | |
| 2002/0194595 A1 | 12/2002 | Miller et al. | |
| 2003/0110503 A1 | 6/2003 | Perkes | |
| 2003/0163478 A1 | 8/2003 | Kirkland | |
| 2003/0221197 A1 | 11/2003 | Fries et al. | |
| 2004/0019904 A1 | 1/2004 | Fellenstein et al. | |
| 2005/0081244 A1 | 4/2005 | Barrett et al. | |
| 2006/0075428 A1 | 4/2006 | Farmer et al. | |
| 2006/0075434 A1 | 4/2006 | Chaney et al. | |
| 2007/0220575 A1 | 9/2007 | Cooper et al. | |
| 2007/0266414 A1 | 11/2007 | Kahn et al. | |
| 2007/0277219 A1 * | 11/2007 | Toebes et al. | 725/139 |

(Continued)

FOREIGN PATENT DOCUMENTS

WO 2006/041784 4/2006

OTHER PUBLICATIONS

International Search Report & Written Opinion issued in Application No. PCT/US 10/23058, mailed Jun. 15, 2010, 16 pages.

(Continued)

*Primary Examiner* — Brian Pendleton
*Assistant Examiner* — Alan Luong
(74) *Attorney, Agent, or Firm* — Fish & Richardson P.C.

(57) ABSTRACT

Caching related technology, in which a time needed to begin rendering network-based video content without caching a decoded version of the content is determined and, the determined time to begin rendering the network-based video content is compared to a threshold time. When the determined time to begin rendering the network-based video content exceeds the threshold time, an initial portion of the network-based video content is pre-transcoded to a faster video codec format, and the pre-transcoded initial portion of the network-based video content is stored in electronic storage associated with a media system of a user.

23 Claims, 29 Drawing Sheets

U.S. PATENT DOCUMENTS

| | | |
|---|---|---|
| 2007/0299976 A1 | 12/2007 | Zafar et al. |
| 2008/0022320 A1 | 1/2008 | Ver Steeg |
| 2008/0022341 A1* | 1/2008 | Walter et al. .................. 725/113 |
| 2008/0092168 A1 | 4/2008 | Logan et al. |
| 2008/0115182 A1 | 5/2008 | Van Willigenburg |
| 2008/0117339 A1 | 5/2008 | Kirsche |
| 2009/0235308 A1 | 9/2009 | Ehlers et al. |
| 2010/0005499 A1* | 1/2010 | Covey ........................... 725/109 |
| 2010/0325653 A1* | 12/2010 | Matz ................................ 725/28 |

OTHER PUBLICATIONS

U.S. Non-Final Office for U.S. Appl. No. 12/366,372 dated Sep. 22, 2011, 21 pages.
U.S. Notice of Allowance for U.S. Appl. No. 12/366,394 dated Oct. 9, 2012, 41 pages.
U.S. Notice of Allowance for U.S. Appl. No. 12/366,350 dated Nov. 14, 2012, 38 pages.

* cited by examiner

4:15pm

| Content | Action (Rules Allow 2 Downloads From CDN Prior to 6pm) |
|---|---|
| IP Video 2 | Downloading From PNS – Estimated Time = 25 Mins ⎯ 2322a |
| IP Video 3 | Download from CDN Complete ⎯ 2322b |
| IP Video 4 | Est. Time from PNS = 50 Min, Start Download from CDN ⎯ 2322c |
| IP Video 5 | Downloading From CDN – Estimated Time = 20 Mins ⎯ 2322d |
| IP Video 6 | Downloading From PNS – Estimated Time = 40 Mins ⎯ 2322e |
| IP Video 7 | Delay Consideration Until 5pm |

4:30pm

| Content | Action – Rules Allow 1 Download From CDN Prior to 6pm |
|---|---|
| IP Video 2 | Downloading From PNS – Estimated Time = 20 Mins ⎯ 2324a |
| IP Video 3 | Download from CDN Complete |
| IP Video 4 | Downloading from CDN – Estimated Time = 5 Mins ⎯ 2324b |
| IP Video 5 | Downloading From CDN – Estimated Time = 10 Mins ⎯ 2324c |
| IP Video 6 | Downloading From PNS – Estimated Time = 30 Mins ⎯ 2324d |
| IP Video 7 | Delay Consideration Until 5pm |

| Content | Action – Rules Allow 1 Download From CDN Prior to 6pm |
|---|---|
| IP Video 2 | Est. Time From PNS = 25 Mins ; Start Download from CDN ⌒ 2326a |
| IP Video 3 | Download from CDN Complete |
| IP Video 4 | Download from CDN Complete ⌒ 2326b |
| IP Video 5 | Download from CDN Complete ⌒ 2326c |
| IP Video 6 | Est. Time From PNS = 20 Mins ; Continue Download form PNS ⌒ 2326d |
| IP Video 7 | Start Download From PNS ; Est. Time = 10 Mins ⌒ 2326e |

5pm

| Content | Action – Rules Allow 0 Downloads From CDN Prior to 6pm |
|---|---|
| IP Video 2 | Download Complete – Play if Meta-Channel 1 Is Selected ⌒ 2328a |
| IP Video 3 | Download Complete – Play if Meta-Channel 2 Is Selected ⌒ 2328c |
| IP Video 4 | Download Complete – Play if Meta-Channel 3 Is Selected ⌒ 2328d |
| IP Video 5 | Download Complete – Play if Meta-Channel 4 Is Selected ⌒ 2328e |
| IP Video 6 | Downloading From PNS – Estimated Time = 5 Mins ⌒ 2328f |
| IP Video 7 | Download Complete – Play if Meta-Channel N Is Selected ⌒ 2328b |

FIG. 23C

META CHANNEL CACHING AND INSTANT VIEWING RELATED TECHNOLOGY

FIELD

The present disclosure generally relates to media device control.

BACKGROUND

Television viewers today are exposed to an overwhelming amount of information and are challenged by the degree of interaction and personalization needed to manage this massive amount of information. In an era of digital television, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of enabling a media system to render content, the method includes storing, in first electronic storage, meta-channel information defining multiple meta-channels that identify content entries and that indicate an order with which to experience the content entries and accessing, from the meta-channel information stored in the first electronic storage, content entries corresponding to content defined by each of the multiple meta-channels for a particular time frame. The accessed content entries include at least one content entry that relates to a first type of content broadcast by a content provider at a specific time and at least one content entry that relates to a second type of content made available, over a network, by a content provider in response to user requests. Based on the accessed content entries, a type of content defined by each of the multiple meta-channels for the particular time frame is identified. Based on the identified type of content defined by each of the multiple meta-channels for the particular time frame, a subset of the multiple meta-channels is selected. The selected subset of meta-channels may each define, for the particular time frame, the second type of content made available, over a network, by a content provider in response to user requests. The method also may include storing, in second electronic storage associated with a media system of a user, a decoded version of the content defined for the particular time frame by each of the meta-channels included in the selected subset of meta-channels and, in response to selection, by the user during the particular time frame, of one of the meta-channels included in the selected subset of meta-channels, controlling the media system to render content defined by the selected meta-channel using the decoded version of the content stored in the second electronic storage associated with the media system of the user.

Implementations may include one or more of the following features. For example, the method may include controlling the media system to render content defined by the selected meta-channel using the decoded version of the content stored in the second electronic storage. Using the decoded version may enable a channel switching time for switching to the selected meta-channel to be comparable to a channel switching time for switching to a meta-channel the defines the first type of content broadcast by a content provider at a specific time.

The method may include controlling the media system to render content defined by the selected meta-channel using the decoded version of the content stored in the second electronic storage. Using the decoded version may enable a channel switching time for switching to the selected meta-channel to be less than half a second. Controlling the media system to render content defined by the selected meta-channel without using the decoded version of the content stored in the second electronic storage may result in a channel switching time for switching to the selected meta-channel that is greater than half a second.

In some implementations, the method may include initially using the decoded version of the content stored in the second electronic storage to render the content defined by the selected meta-channel and triggering a process to render an original version, other than the decoded version, of the content defined by the selected meta-channel. The process to render the original version of the content defined by the selected meta-channel may have a longer delay to begin rendering of the content than initially using the decoded version of the content. In these implementations, when the original version of the content defined by the selected meta-channel is ready for rendering, the method may include transitioning from using the decoded version of the content to using the original version of the content.

The method also may include identifying an amount of content that has been rendered using the decoded version of the content and identifying a transition point in the original version of the content that corresponds to the amount of content that has been rendered using the decoded version of the content. To enable smooth transition from the decoded version of the content to the original version of the content, using the original version of the content may begin at the transition point.

In some examples, the method may include decoding the original version of the content defined by the selected meta-channel using a video codec. In these examples, the method may include sending, over a network, a request to a content provider serving the original version of the content defined by the selected meta-channel and downloading, over the network from the content provider, the original version of the content defined by the selected meta-channel.

The method may include identifying the multiple meta-channels that define, for the particular time frame, the second type of content made available, over a network, by a content provider in response to user requests and for which a time needed to begin rendering content defined by the meta-channel without storing, in the second electronic storage associated with the media system of the user, a decoded version of the content exceeds a threshold time. For each of the identified meta-channels, the method may include determining an amount of content needed to be stored, in the second electronic storage associated with the media system of the user, to enable transition from using a decoded version of the content to using an original version of the content without a break in content rendering. The method also may include determining whether the second electronic storage associated with the media system of the user has the ability to store the determined amount of content for each of the identified meta-channels prior to the particular time frame. Conditioned on determining that the second electronic storage associated with the media system of the user has the ability to store the determined amount of content for each of the identified meta-channels prior to the particular time frame, all of the identified meta-channels may be selected as the subset of the multiple meta-channels. Conditioned on determining that the second electronic storage associated with the media system of the user does not have the ability to store the determined amount of content for each of the identified meta-channels prior to the particular time frame, a subset of the identified meta-channels may be selected as the subset of the multiple meta-channels.

The method may include determining whether the amount of content for the identified meta-channels exceeds an amount of available storage in the second electronic storage associated with the media system of the user. The method also may include determining whether an amount of time remaining until a start of the particular time frame exceeds an amount of time needed for the media system to download, decode, and store the determined amount of content for each of the identified meta-channels. The method further may include identifying combinations of the identified meta-channels for which the second electronic storage associated with the media system of the user has the ability to store, prior to the particular time frame, the determined amount of content for each of the meta-channels included in the combination and selecting, from among the identified combinations, a combination of the identified meta-channels that includes the highest number of channels.

In some example, the method may include accessing historical viewing patterns that indicate one or more categories of content the user has experienced during past time frames that are similar to the particular time frame and comparing the content defined by each of the identified meta-channels to the accessed historical viewing patterns. In these examples, the method may include determining a subset of the identified meta-channels that the user is mostly to experience during the particular time frame based on the comparison of the content defined by each of the identified meta-channels to the accessed historical viewing patterns and selecting the determined subset of the identified meta-channels.

In some implementations, the method may include determining a meta-channel being experienced by the user at the time of selecting and accessing information that identifies one or more meta-channels the user typically selects subsequent to experiencing the meta-channel being experienced by the user at the time of selecting. In these implementations, the method may include comparing the accessed information to the identified meta-channels, determining a subset of the identified meta-channels that the user is most likely to experience during the particular time frame based on the comparison of the accessed information to the identified meta-channels, and selecting the determined subset of the identified meta-channels.

In another aspect, a system may include a first electronic storage device configured to store meta-channel information defining multiple meta-channels that identify content entries and that indicate an order with which to experience the content entries and a second electronic storage device associated with a media system of a user. The system also may include at least one processor configured to perform operations that include accessing, from the meta-channel information stored in the first electronic storage device, content entries corresponding to content defined by each of the multiple meta-channels for a particular time frame. The accessed content entries include at least one content entry that relates to a first type of content broadcast by a content provider at a specific time and at least one content entry that relates to a second type of content made available, over a network, by a content provider in response to user requests. Based on the accessed content entries, a type of content defined by each of the multiple meta-channels for the particular time frame is identified. Based on the identified type of content defined by each of the multiple meta-channels for the particular time frame, a subset of the multiple meta-channels is selected. The selected subset of meta-channels each define, for the particular time frame, the second type of content made available, over a network, by a content provider in response to user requests. The operations also include storing, in the second electronic storage device associated with the media system of the user, a decoded version of the content defined for the particular time frame by each of the meta-channels included in the selected subset of meta-channels and, in response to selection, by the user during the particular time frame, of one of the meta-channels included in the selected subset of meta-channels, controlling the media system to render content defined by the selected meta-channel using the decoded version of the content stored in the second electronic storage device associated with the media system of the user.

In yet another aspect, a method of enabling a media system to render content, the method includes identifying network-based video content made available, over a network, by a content provider in response to user requests and determining a time needed to begin rendering the network-based video content without caching a decoded version of the content in electronic storage associated with a media system that is configured to render the network-based video content and that is remote from the content provider. The method also includes comparing the time needed to begin rendering the network-based video content to a threshold time and, based on comparison results, determining whether the time needed to begin rendering the network-based video content exceeds the threshold time. In response to a determination that the time needed to begin rendering the network-based video content exceeds the threshold time, the method includes pre-transcoding at least an initial portion of the network-based video content to a faster video codec format that is different than a slower video codec format in which the network-based video content is made available, over the network, by the content provider. The faster video codec format allows rendering of the network-based video content to begin faster than the slower video codec format. The method further includes storing, in electronic storage associated with the media system of the user, the pre-transcoded initial portion of the network-based video content to enable faster rendering of the network-based video content by using the pre-transcoded initial portion of the network-based video content in response to user selection of the network-based video content.

Implementations may include one or more of the following features. For example, the method may include determining a time needed to begin rendering the network-based video content based on a time needed to decode the content using a video codec and comparing the determined time needed to begin rendering the network-based video content that is based on the time needed to decode the content using the video codec to a threshold of half a second. The faster video codec format may allow rendering of content to begin in less than half a second and the slower video codec format may allow rendering of content to begin in more than half a second. The initial portion of the content may be less than all of the network-based video content.

In some examples, the method may include determining a time needed to begin rendering the network-based video content using the slower video codec format and selecting the initial portion of the network-based video content to pre-transcode based on the determined time needed to begin rendering the network-based video content using the slower video codec format. In these examples, the initial portion of the network-based video content may be an amount of the network-based video content that, when rendered, lasts for a time that is equal to or greater than the time needed to begin rendering the network-based video content using the slower video codec format.

In some implementations, the method may include receiving, at the media system, user input indicating a desire to view the network-based video content and, in response to receiving the user system, controlling the media system to render the network-based video content using the pre-transcoded initial portion of the network-based video content. In these implementations, the method may include initially using the pre-transcoded initial portion of the network-based video content stored in the electronic storage to render the network-based video content and triggering a process to render an original version, other than the pre-transcoded initial portion, of the network-based video content. The process to render the original version of the network-based video content may have a longer delay to begin rendering of the network-based video content than initially using the pre-transcoded initial portion of the network-based video content. When the original version of the network-based video content is ready for rendering, the method may include transitioning from using the pre-transcoded initial portion of the network-based video content to using the original version of the network-based video content.

The method may include identifying an amount of the network-based video content that has been rendered using the pre-transcoded initial portion of the network-based video content and identifying a transition point in the original version of the network-based video content that corresponds to the amount of content that has been rendered using the pre-transcoded initial portion of the network-based video content. The method also may include beginning using the original version of the content at the transition point to enable smooth transition from the pre-transcoded initial portion of the network-based video content to the original version of the network-based video content.

In some examples, the method may include decoding the original version of the network-based video content using the slower video codec. In these examples, the method may include sending, over a network, a request to a content provider serving the original version of the network-based video content and downloading, over the network from the content provider, the original version of the network-based video content.

In another aspect, a system includes an electronic storage device associated with a media system of a user and at least one processor configured to perform operations that include identifying network-based video content made available, over a network, by a content provider in response to user requests and determining a time needed to begin rendering the network-based video content without caching a decoded version of the content in the electronic storage device associated with the media system that is configured to render the network-based video content and that is remote from the content provider. The operations also include comparing the time needed to begin rendering the network-based video content to a threshold time and, based on comparison results, determining whether the time needed to begin rendering the network-based video content exceeds the threshold time. In response to a determination that the time needed to begin rendering the network-based video content exceeds the threshold time, the operations include pre-transcoding at least an initial portion of the network-based video content to a faster video codec format that is different than a slower video codec format in which the network-based video content is made available, over the network, by the content provider. The faster video codec format allows rendering of the network-based video content to begin faster than the slower video codec format. The operations further include storing, in the electronic storage device associated with the media system of the user, the pre-transcoded initial portion of the network-based video content to enable faster rendering of the network-based video content by using the pre-transcoded initial portion of the network-based video content in response to user selection of the network-based video content.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 23A-C are contextual diagrams illustrating the downloading of content for viewing using a media system.

Like reference numbers represent corresponding parts throughout.

DETAILED DESCRIPTION

Figure 1:
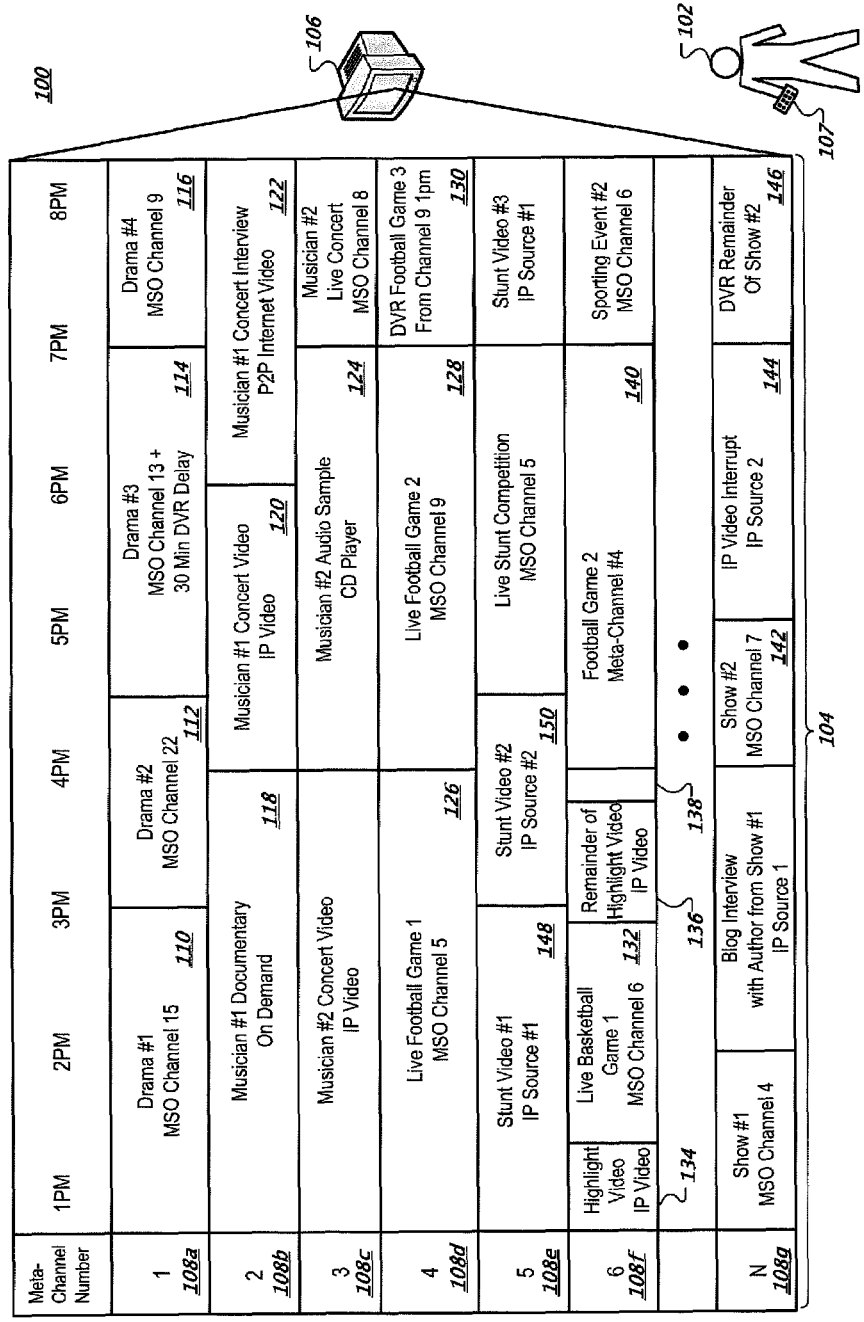
FIG. 1 is a contextual diagram demonstrating general meta-channel usage.

FIG. 1 is a contextual diagram 100 demonstrating general meta-channel usage. A user 102 may view a meta-channel guide 104, which may be displayed on a television screen 106. The guide 104, which may be an electronic program guide, may display information about content to be displayed on one or more meta-channels 108a-g. The guide 104 may display a schedule of content to be presented on a particular day of the week (e.g., Sunday).

Meta-channels 108a-g each identify content entries to be presented on a respective meta-channel, and indicate an order in which the content entries are to be presented on that meta-channel. Content entries may refer to various types of content from various content providers. Each content entry relates to content made available by a specific content provider. A content provider may be, for example, a television broadcaster (e.g., MSO (Multiple System Operator), cable, satellite, local) or a web server serving internet video. A content entry may refer to a television broadcast provided by a broadcaster on a particular channel at a specific time, to a URL (Uniform Resource Locator) of an Internet video resource, or to some other type of content.

Content entries may be assigned to meta-channels by an end consumer and/or by a meta-channel publisher (referred to as a "content jockey"). The end consumer or content jockey may assign and organize content entries in a particular meta-channel based on any criteria the end consumer or content jockey chooses (e.g., an end consumer may define a meta-channel that selects the end consumer's favorite or preferred content that is available at each time frame).

In some examples, content entries may be assigned to meta-channels and organized together based on a particular type of content. For instance, the meta-channel 108a presents drama-related content, the meta-channel 108b presents content related to a specific musician, the meta-channel 108c presents content related to a second, different musician, the meta-channel 108d presents football-related content, the meta-channel 108e presents stunt-related content, the meta-channel 108f presents sports-related content, and the meta-channel 108g presents entertainment-related content. When an end consumer is interested in viewing a particular type of content, the end consumer may select the meta-channel corresponding to the particular type of content (e.g., the end consumer selects the meta-channel 108d when the end consumer is interested in viewing football-related content).

As displayed in the guide 104, a first content entry 110 indicates that a first drama program received from an MSO channel 15 is scheduled to be presented on the meta-channel 108a from 1 p.m. to 3 p.m. A second content entry 112 indicates that a second drama program received from an MSO channel 22 is scheduled to be presented on the meta-channel 108a from 3 p.m. to 4:30 p.m. A third content entry 114 indicates that a third drama program received from an MSO channel 13 is scheduled to be presented on the meta-channel 108a from 4:30 p.m. to 7 p.m. The program indicated by content entry 114 is originally scheduled to be broadcast on the MSO channel 13 starting at 4 p.m., so the program may be recorded onto a DVR (Digital Video Recorder) and played from the DVR recording on the meta-channel 108a (e.g., with a 30-minute delay from it's live broadcast). A fourth content entry 116 indicates that a fourth drama program 116 received from a MSO channel 9 is scheduled to be presented on the meta-channel 108a from 7 p.m. to 8 p.m.

When an end consumer selects to experience the meta-channel 108a, the end consumer's media system is controlled to, without human intervention, display the content defined by the content entries in the meta-channel 108a. For instance, at 1 p.m., the media system is controlled to display MSO channel 15 (e.g., a television tuner is controlled to tune to MSO channel 15 and an input source of a display device is controlled to display a video signal from the television tuner). The media system displays MSO channel 15 until 3 p.m. at which time the media system is controlled to change from MSO channel 15 to MSO Channel 22 (e.g., the television tuner is controlled to tune to MSO channel 22). At 4 p.m., the media system is controlled to maintain the display of MSO Channel 22, but also begins recording MSO channel 13 using a DVR. At 4:30 p.m., the media system is controlled to display the content recorded on the DVR from MSO Channel 13 and, at 7 p.m., the media system is controlled to display MSO channel 9.

As mentioned, content presented on a meta-channel may be provided by content providers other than a traditional television broadcaster. For example, a content entry 118 indicates that a documentary program is scheduled to be presented on the meta-channel 108b from 1 p.m. to 4 p.m. The program indicated by the content entry 118 is received from an "on demand" service, such as from a service offered by a cable television operator. A content entry 120 indicates that a concert video received from an IP (Internet Protocol) video source is scheduled to be presented on the meta-channel 108b from 4 p.m. to 6 p.m. The content entry 120 can refer to, for example, a URL of an Internet video resource served by a web server (e.g., www.youtube.com). A content entry 122 indicates that a concert interview is to be presented on the meta-channel 108b from 6 p.m. to 8 p.m. The interview is to be received from a P2P (Peer to Peer) Internet video source. P2P streaming is a technology that allows for the distribution of content between client computers without the need for a central server.

In addition to video content, other forms of content, such as audio content, also can be presented on a meta-channel. For example, a content entry 124 indicates that an audio sample of a musician is scheduled to be presented on the meta-channel 108c from 4 p.m. to 7 p.m. An audio sample can be played from a CD player included in a media system, from a P2P audio stream, or from a digital recording stored on a device in a media system, to name a few examples.

When a selected meta-channel includes multiple forms of content (e.g., television broadcasts, On Demand content, IP video sources, audio samples, P2P content, content from local media players, etc.), the media system is controlled to transition between the multiple forms of content without human intervention. For instance, the user perceives the content changing similar to how a user perceives content changing on a broadcast television channel despite the content being delivered from multiple, different providers in multiple, different forms. In some examples, the media system is controlled to change an input video/audio source of an output device (e.g., video display device, a speaker, etc.) to output the form of content presently defined by the selected meta-channel.

In some implementations, as illustrated in the guide 104, a content entry 126 indicates that a first live football game received from MSO channel 5 is scheduled to be presented on the meta-channel 108d from 1 p.m. to 4 p.m., and a content entry 128 indicates that a second live football game received from MSO channel 9 is scheduled to be presented on the meta-channel 108d from 4 p.m. to 7 p.m. The selection of content, such as the selection of the football game indicated by the content entry 126, may be dynamically chosen based on a stored user's preferences, such as preferences for a particular team and/or region of the country. For example, a user's preferences may indicate a preference for a team or teams playing in the game offered by MSO channel 5 at 1 p.m. over a team or teams playing in a game offered by MSO channel 9, also at 1 p.m. The meta-channel 108d may be configured to present the live game from MSO channel 5 at 1 p.m. and to present, starting at 7 p.m., a recording of the game offered earlier by MSO channel 9 (as indicated by a content entry 130). The particular games selected and/or the order of the games may be dynamically determined based on the user's profile information (e.g., favorite team preference, region data, etc.). As such, a first user with first profile information may receive different games (or a different order of games) when viewing the meta-channel 108d than a second user with second profile information that is also viewing the meta-channel 108d.

Other meta-channel configurations are possible. For example, a content entry 132 indicates that a basketball sporting event received from MSO channel 6 is scheduled to be presented on the meta-channel 108f. The meta-channel 108f may be configured so that only the live game portion of the sporting event is presented, and that other content may be presented on the meta-channel 108f during pre-game and post-game portions (e.g., pre and/or post-game commentary that may be ordinarily aired live on the MSO channel 6).

For example, a content entry 134 indicates that a highlight video received from an Internet video source is scheduled to be presented on the meta-channel 108f, from approximately 1 p.m. to 1:30 p.m. (e.g., in place of pre-game commentary that may be airing live on MSO channel 6). The highlight video may be interrupted once the live game portion of the sporting event indicated by the content entry 132 begins. A content entry 136 indicates that the remainder of the highlight video is scheduled to be presented on the meta-channel 108f once the live game coverage has ended (e.g., from approximately 2:50 p.m. until 3:40 p.m., in place of post-game commentary that may be airing live on MSO channel 6). A gap 138 appears on the guide 104, indicating that the highlight video may end before the start of the next program scheduled to be presented at 5 p.m. on the meta-channel 108*f* (e.g., as indicated by content entry 140). During the time period represented by the gap 138, the television screen may be blank, or other content may be presented, such as a static advertising display, advertising content received from an Internet source, audio music, etc.

A meta-channel may be defined to display content presented on another meta-channel. For example, the content entry 140 indicates that a football game is scheduled to be presented on the meta-channel 108*f* from 4 p.m. to 7 p.m., where the source of the football game content is the meta-channel number 4 (e.g., meta-channel 108*d*). In other words, in this example, when the user tunes to either the meta-channel 108*d* or the meta-channel 108*f* between 4 p.m. and 7 p.m., the football game broadcast received from MSO channel 9 is presented on the television screen 106.

As indicated by a content entry 142, an entertainment show received from MSO channel 7 is scheduled to be presented on the meta-channel 108*g* starting at 4 p.m. As indicated by a content entry 144, the entertainment show indicated by the content entry 142 is interrupted by a video program received from an Internet source. The meta-channel 108*g* may be configured so that content being presented is interrupted by and replaced with other content if an event occurs. For example, an interrupt event can be defined such that if a new Internet video relating to a particular topic is published, the Internet video is downloaded, decoded and presented on the meta-channel 108*g*. The content that was interrupted can be recorded onto a DVR and the unseen portion can be scheduled to be viewed at a later time (e.g., a content entry 146 indicates that the remainder of the interrupted entertainment show is scheduled to be presented starting at 7 p.m. on the meta-channel 108*g*).

The user 102 may navigate the guide 104, for example by using directional buttons on a remote control 107, to change selection of a content entry. The user may, for example, press a button on the remote control 107 to invoke an action to be performed relating to the selected content entry. For example, the user may press a button to switch to the meta-channel indicated by the selected content entry (which, for content entries currently being presented (e.g., now playing on the meta-channel), may result in the rendering of the selected content on the television screen 106). As another example, a user may press a button to record a program represented by the selected content entry to a DVR, or may press a button to get more detailed information about a program represented by the selected content entry.

Switching of content sources may automatically occur, depending on the arrangement of scheduled content entries in a meta-channel and/or depending on the forms of content being presented as a user switches to and from different meta-channels. For example, a content entry 148 indicates that a first stunt video received from a first Internet video source is scheduled to be presented on the meta-channel 108*e*. When the stunt video indicated by the content entry 148 completes, a second stunt video received from a second Internet video source is scheduled to be presented on the meta-channel 108*e*, as indicated by a content entry 150.

While presenting Internet video content, a media system may be configured to receive content from a digital media adapter (DMA). If the user 102 is watching the meta-channel 108*e* between 1 p.m. and 4 p.m., a DMA may download the first stunt video from the first video source, and may subsequently download the second stunt video from the second video source. In other words, content for adjacent content entries may be received from different sources (different Internet video sources), but the type of content (e.g., Internet video) may remain the same, which may result in the maintaining of an input source setting of a display device to render content from a DMA. As another example, if the user watches the meta-channel 108*a* between 1 p.m. and 4 p.m., an input source may be maintained at a setting to receive content from an MSO receiver, but the MSO receiver may be automatically tuned to switch from MSO channel 15 to MSO channel 22 at 3 p.m.

In contrast, if, for example, the user manually switches (e.g., by pressing a button on the remote 107) from the meta-channel 108*e* to the meta-channel 108*d* at 2 p.m., the display of the stunt video indicated by the content entry 148 may be replaced by the display of the football game indicated by the content entry 126. Since the source type of the content indicated by the content entry 126 (e.g., an MSO channel) is different than the source type of the content indicated by the content entry 148 (e.g., an Internet video), an input source setting of a display device may be changed and the media system may be controlled to receive and output content from the new type of source. As another example, if the user watches the meta-channel 108*b* between 1 p.m. and 5 p.m., the media system may switch an input source from an on-demand video source to an Internet video source, to present the concert video (Internet video) indicated by the content entry 120 after the documentary (on-demand video) indicated by the content entry 118.

By experiencing content using meta-channels, an end consumer may reduce the overwhelming number of content options available to a manageable number for user selection. The task of identifying interesting content and reviewing the overwhelming number of content options may be distributed among users of the meta-channel (e.g., content jockeys and shared user meta-channels) and thereby reduce the burden on individual users of identifying interesting content. Instead, an individual user may select a small subset of meta-channels in which the user is interested and then select among those meta-channels when experiencing content. Individual users may select meta-channels based on the subject matter of the meta-channel or affinity for the content jockey that manages the meta-channel.

In addition, organizing many different forms of content in single channels may enhance the viewing experience of users by, for example, reducing the amount of time/expertise needed to select and perceive different forms of content. Specifically, users need not move between different devices or locations to perceive content of different forms, as the media system is automatically controlled to perform these operations for the user. Moreover, the different forms of content may be available in a single location or interface as opposed to multiple locations or interfaces, each being directed to a particular form of content.

Figure 2:
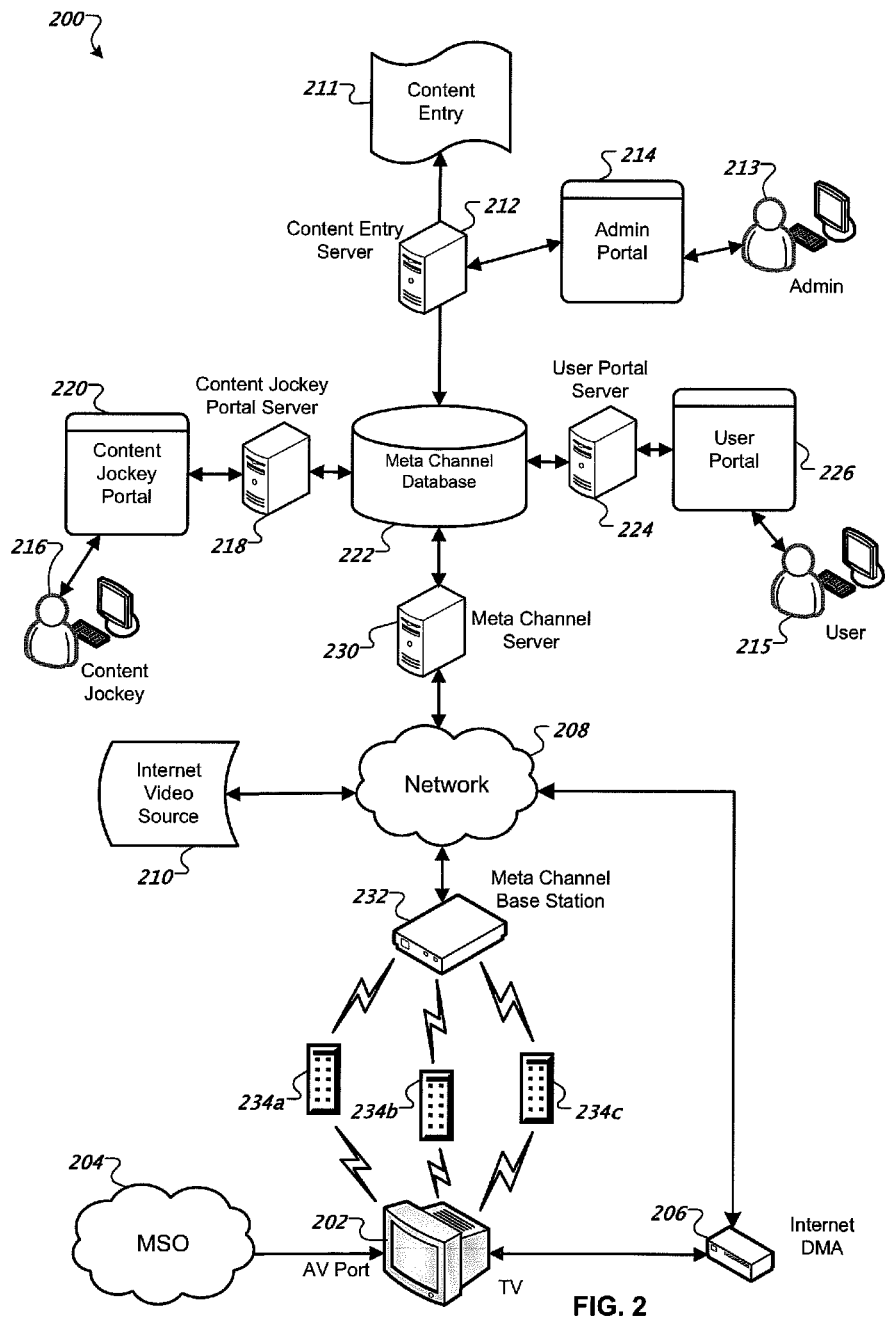
FIG. 2 illustrates a meta-channel system.

FIG. 2 illustrates a meta-channel system 200. Content is rendered on a television 202. The television 202 may be analog or digital. In some implementations, another type of display other than a television may be used (e.g., a computer monitor). Digital and/or analog video content may be received through an AV (Audio/Video) port from one or more broadcasters 204, such as from one or more MSO's.

Video content also may be received from an Internet DMA 206. The Internet DMA 206 may receive Internet video content over the network 208, from one or more Internet video sources 210. An Internet video source 210 may be source that makes a video file or a video feed (e.g., podcast) available over the Internet, or may be another type of peer to peer resource, such as a BitTorrent file. The Internet DMA 206 may be configured to store (e.g., cache) video content. The network 208 may be one or more public or private, wired or wireless networks, such as the Internet, or may be a Session Initiated Protocol (SIP) network such as the PsipTN network offered by TelTel.

A meta-channel definition may refer to one or more content entries 211. A content entry 211 is a collection of information about program content to be displayed on the television 202. For example, for program content received from an MSO 204, a content entry 211 may include information regarding the program time, title, description, channel number, start time and stop time. As another example, a content entry 211 may refer to an Internet feed of an EPG (Electronic Program Guide) which can include or provide information relating to program content received from an MSO 204. For program content received from an Internet video source 210, a content entry 211 may include, for example, the URL of the Internet video resource 210 or the name and/or address of a BitTorrent torrent file. A content entry 211 also may include other information, such as a program's genre or classification (e.g., children's programming, soap opera, sporting event, entertainment, etc.) or rating (e.g., Nielsen rating, Internet blog rating).

A content entry server 212 may be a server that adds content entries 211 to the meta-channel system 200 to enable users to include the added content entries in meta-channels. For instance, the content entry server 212 may access the content entries 211 from various third party sources (e.g., EPG's, Internet video providers, rating service providers, etc.) and may store the accessed content entries in a repository residing in the content entry server 212 or the meta-channel database 222.

An administrator 213 can use an administrator portal user interface 214 to manage the content entries 211 added to the meta-channel system 200 using the content entry server 212. For example, the administrator 213 may select which content entries to add to the meta-channel system 200 (e.g., the administrator 213 may filter out content entries corresponding to inappropriate content) and may select which content entries to remove from the meta-channel system 200 (e.g., the administrator 213 may remove content entries corresponding to relatively old content that has already been broadcast or has been available on the meta-channel system 200 for a relatively long period of time with little interest). The administrator 213 may use the administrator portal user interface 214 to directly manage the content entries available on the meta-channel system 200 or may use the administrator portal user interface 214 to define a set of rules that the content entry server 212 automatically implements to manage the content entries available on the meta-channel system 200.

A meta-channel may be defined, for example, by an end user 215 or by a "content jockey" 216. A content jockey 216 creates and publishes meta-channel definitions to be made available to users 215. A content jockey portal server 218 may provide a content jockey portal user interface 220 to the content jockey 216. Using the content jockey portal 220, the content jockey 216 may define a meta-channel by selecting content entries 211, indicating content to air at specific days and times on a defined meta-channel. For example, the content jockey 216 may select content entries pertaining to a category of content or related to a particular user group, such as content related to a particular entertainer, sporting team or game. A content jockey also can create and make available custom video content and/or advertising. Meta-channels defined by the content jockey 216 may be stored in a meta-channel database 222.

A user portal server 224 may provide a user portal user interface 226 to the user 215. Before defining meta-channels, the user 215 may need to register (using, for example, the user portal 226) for a meta-channel service. When registering, the user 215 may provide a list of MSO channels available to the user 215. Using the user portal 226, the user 215 may define meta-channels and/or may select to use, or subscribe to, meta-channels defined by the content jockey 216. The selection of content entries allowed for defining meta-channels by a user may be limited, for MSO content, to content entries related to MSO channels available to the user 215. Similar to the content jockey 216, the user 215 may define one or more meta-channels by selecting one or more content entries 211 to air on a specific meta-channel at a specific day and time. The user may assign a channel number (e.g., "3") to correspond to a defined meta-channel. Meta-channels defined by the user 215 may be stored in the meta-channel database 222.

A meta-channel server 230 can communicate, over the network 208, meta-channel information including a list of meta-channels defined by the user 215 to a meta-channel base station 232. The meta-channel base station 232 may store (e.g., cache) meta-channel information received from the meta-channel server 230. The meta-channel base station 232 may communicate wirelessly with one or more remote control devices 234. The remote control devices 234 may communicate (e.g., using Infrared (IR) technology) with the television 202. The remote control devices 234 may include a small display screen.

The meta-channel base station 232 may be configured to receive a signal from a remote control device 234 indicating a channel number corresponding to a button pressed on the remote control device 234. The meta-channel base station 232 may be configured to forward the signal to the meta-channel server 230. The meta-channel server 230 may be configured to map a received signal to a user's meta-channel and to identify a content entry defined by the user's meta-channel. The meta-channel server 230 may be configured to send a control command to the meta-channel base station 232 indicating an MSO channel corresponding to an identified content entry. The meta-channel base station 232 may be configured to forward the control signal to the remote control device 234a and the remote control device 234a may be configured to send an IR signal to the television 202, indicating a channel change. The television 202 may be configured to receive the IR signal and may be configured to tune to the specified channel (e.g., channel 22) to display the broadcast television content.

Each of the remote control devices 234a, 234b, and 234c may be assigned to a particular user (e.g., a mother, a father, and a child). Accordingly, when the meta-channel base station 232 receives a command from one of the remote control devices 234a, 234b, and 234c, the meta-channel base station 232 (or the meta-channel server 230) may identify the particular user assigned to the remote control and use the customized meta-channel configured for the particular user.

For example, the remote control device 234a may be assigned to a father user and the remote control device 234b may be assigned to a mother user. In this example, when the meta-channel base station 232 receives a command from the remote control device 234a, the command is mapped to meta-channel information customized by the father user (e.g., a command to tune to meta-channel three may map to a sports meta-channel). When the meta-channel base station 232 receives a command from the remote control device 234b, the command is mapped to meta-channel information customized by the mother user (e.g., a command to tune to meta-channel three may map to a soap opera meta-channel).

Figure 3:
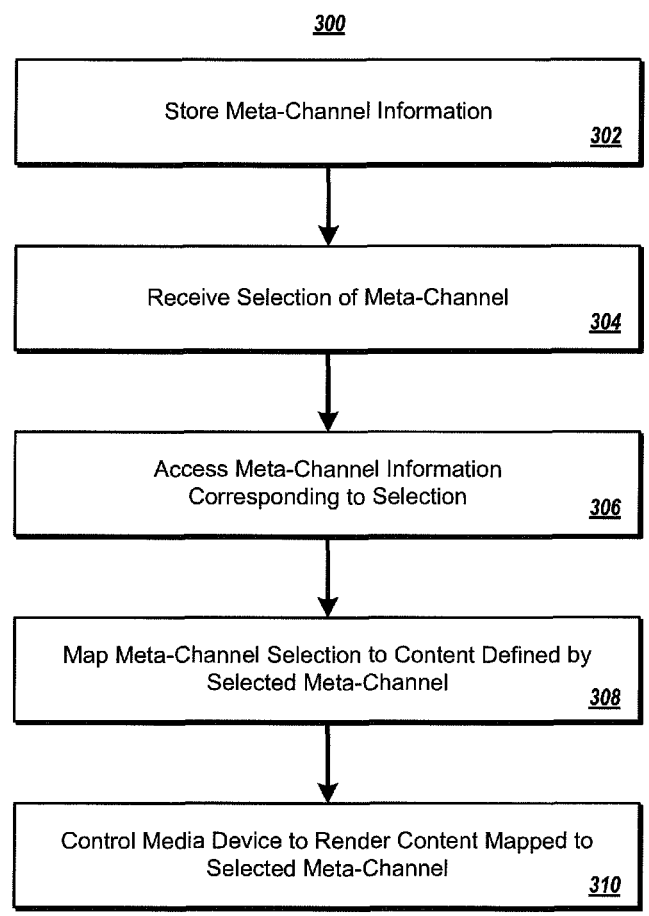
FIGS. 3 to 9, 11, 13, 15, 18 to 22, 25, and 26 are flowcharts of exemplary processes.

FIG. 3 is a flowchart illustrating a computer-implemented process 300 for controlling a media device. Briefly, the computer-implemented process 300 includes storing meta-channel information, receiving selection of a meta-channel, accessing meta-channel information corresponding to the selection, mapping the meta-channel selection to content defined by the selected meta-channel, and controlling a media device to render content mapped to by the selected meta-channel.

In further detail, when the process 300 begins, meta-channel information is stored (302). For example, meta-channel information may define multiple meta-channels, where each meta-channel may refer to content entries and define an order in which content entries are to be presented on a particular meta-channel. A content entry relates to content available from a content provider, such as a television broadcaster or an Internet video source. Meta-channel information may be stored in a central repository and may be transferred to and cached on a meta-channel base station residing, for example, in a user's home. The meta-channel information may include information needed to display the meta-channel guide 104 shown in FIG. 1.

After meta-channel information is stored, a selection of a meta-channel is received (304). For example, a user may press a button on a remote control device indicating selection of a meta-channel number (e.g., channel "3"). The remote control device may communicate an input control command indicating the selected channel number to the meta-channel base station. The meta-channel base station may forward the input control command to a meta-channel server.

After the selection of a meta-channel is received, meta-channel information corresponding to the selection is accessed (306). For example, an input control command corresponding to a selected meta-channel number (e.g., channel "3") may be received at the meta-channel server. In response to receipt of the input control command, the meta-channel server accesses meta-channel information that corresponds to channel "3" for the user that entered the command. The meta-channel server may access the meta-channel information from a meta-channel database managed by the meta-channel server.

Next, the meta-channel selection is mapped to content defined by the selected meta-channel (308). For example, a content entry corresponding to the selected meta-channel and to the current day and time may be accessed, to identify content currently scheduled to be presented on the selected meta-channel. In some implementations, broadcast television content received from a specific cable television channel may be scheduled to be presented and the meta-channel selection is mapped to the broadcast television content. Other examples include mapping the selection to content relating to an Internet video, audio CD music, or content from an "on-demand" cable television service.

A media device is controlled to render content mapped to the selected meta-channel (310). For example, a television receiver may be tuned to a specific channel indicated by the mapped content entry and a television broadcast received from the television receiver may be rendered on a television display. As another example, an Internet video may be downloaded to a media adapter, decoded and rendered on a television display screen. The Internet video also may be streamed over a network and rendered on the television display screen.

In some implementations, the Internet video may be downloaded to the media adapter prior to selection of the meta-channel. In these implementations, the Internet video downloaded to the media adapter prior to selection of the meta-channel is used in rendering the Internet video on a television display screen. The Internet video downloaded to the media adapter prior to selection of the meta-channel also may be pre-transcoded to enable faster rendering of the Internet video upon selection. Downloading and pre-transcoding the Internet video prior to selection of the meta-channel may enable enhanced user experience (particularly for relatively large files that have a relatively long download time) because the downloaded and pre-transcoded Internet video may be rendered more quickly than if the Internet video needed to be downloaded to the media adapter. The examples illustrated in FIGS. 16 to 26 may be used in downloading and pre-transcoding the Internet video prior to selection of the meta-channel.

Figure 4:
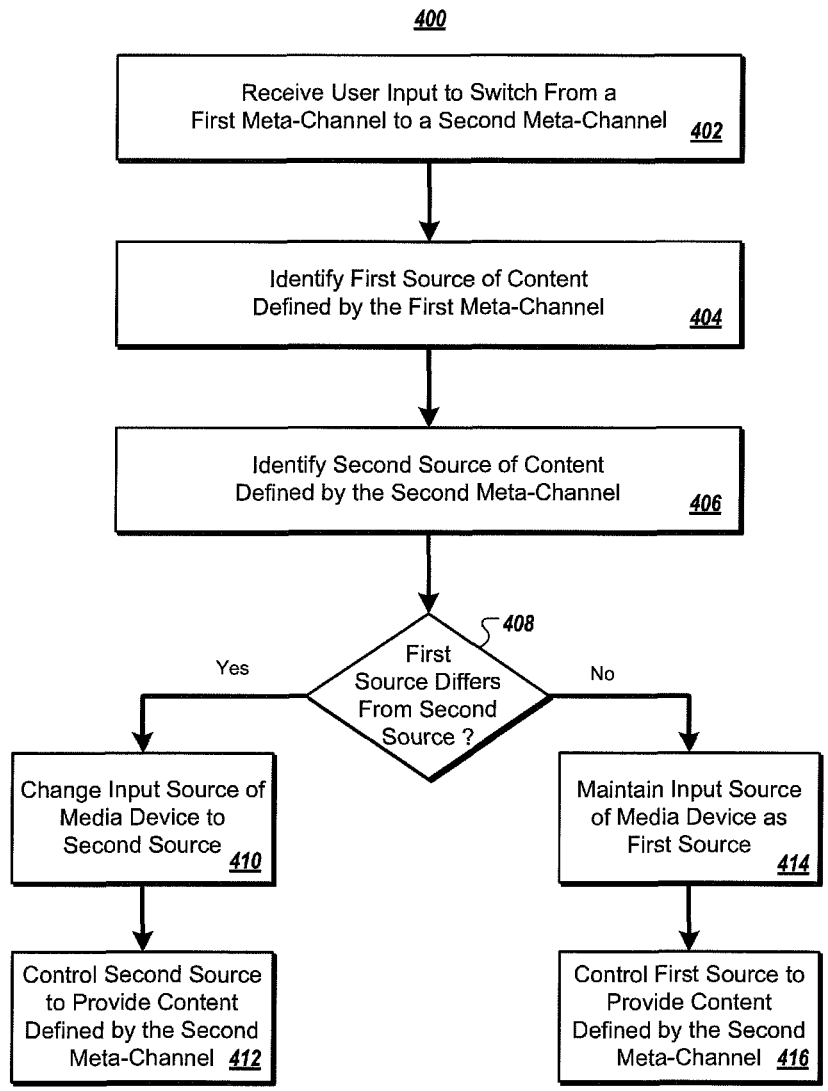

FIG. 4 is a flowchart illustrating a computer-implemented process 400 for switching meta-channels. Briefly, the computer-implemented process 400 includes receiving user input to switch from a first meta-channel to a second meta-channel, identifying a first source of content defined by the first meta-channel, identifying a second source of content defined by the second meta-channel, and determining whether the first source differs from the second source. If it is determined that the first source differs from the second source, the process 400 further includes changing the input source of the media device to the second source and controlling the second source to provide content defined by the second meta-channel. If it is determined that the first source does not differ from the second source, the process 400 further includes maintaining the input source of the media device as the first source and controlling the first source to provide content defined by the second meta-channel.

In further detail, when the process 400 begins, user input to switch from a first meta-channel to a second meta-channel is received (402). For example, a user may be watching a television which is currently presenting content associated with a first meta-channel number (e.g., meta-channel "4"). The user may press a button on a remote control device indicating selection of a second meta-channel number (e.g., meta-channel "3"). The remote control device may communicate an input control command indicating the selected meta-channel number to the meta-channel base station and the meta-channel base station may forward the input control command to a meta-channel server.

A first source of content defined by the first meta-channel is identified (404). For example, currently-presented content on the first meta-channel may be identified, and a content source of the currently-presented content may be identified. The first source may be an MSO television broadcast or an Internet video resource. In some examples, the first source may be identified as a television receiver (e.g., a cable set top box) that receives an MSO television broadcast and outputs a video signal of the MSO television broadcast or an Internet DMA that downloads an IP video and outputs a video signal of the IP video.

A second source of content defined by the second meta-channel is identified (406). For example, content scheduled to be presented on the second meta-channel at the current day and time may be identified and a content source of the scheduled content may be identified, such as an MSO television broadcast or an Internet video resource.

Next, it is determined whether the first source differs from the second source (408). For example, it may be determined that the first source differs from the second source if the first source is an MSO television broadcast and the second source is an Internet video resource. It may be determined that the first source does not differ from the second source if, for example, both the first source and the second source are MSO television broadcasts. In some examples, the first and second sources may be different when the sources render a similar type of content, but from different content providers or using different delivery mechanisms (e.g., the first source may be a cable set top box and the second source may be a satellite television receiver).

If the first source differs from the second source, the input source of the media device is changed to the second source (410). For example, if the first source is an MSO television broadcast and the second source is an Internet video, then the input source of the media device may be changed to be Internet video (e.g., receiving input from an Internet media adapter). As another example, if the first source is an Internet video and the second source is an MSO television broadcast, then the input source of the media device may be changed to be MSO television broadcast (e.g., receiving input from a television receiver). The input source may be changed automatically, without human intervention.

After the input source of the media device is changed, the second source is controlled to provide content defined by the second meta-channel (412), thereby ending the process 400. For example, if the second source was changed to be Internet video, an Internet video resource may be rendered on a television display. In this example, the Internet video resource may be downloaded, decoded, and rendered in response to the change in input source, may be streamed over a network in response to the change in input source, or may be rendered in response to the change in input source using a version of the Internet video resource downloaded prior to the change in input source. As another example, if the second source was changed to be an MSO television broadcast, a receiver may be tuned to an MSO channel indicated by the second source of content, and the video content broadcast from the MSO channel may be rendered on a television display.

If the first source does not differ from the second source (e.g., in step 408) the input source of the media device is maintained as the first source (414). For example, if the first source and second source are both MSO television broadcasts, the input source of the media device is maintained as MSO television broadcast (e.g., to continue to receive input from a television receiver). As another example, if the first source and second source are both Internet video, the input source of the media device is maintained as Internet video (e.g., to continue to receive input from an Internet media adapter).

The first source is controlled to provide content defined by the second meta-channel (416), thereby ending the process 400. For example, if the content defined by the second meta-channel is Internet video, an Internet video resource may be rendered on a television display. In this example, the Internet video resource may be downloaded, decoded, and rendered in response to the change in meta-channel, may be streamed over a network in response to the change in meta-channel, or may be rendered in response to the change in meta-channel using a version of the Internet video resource downloaded prior to the change in meta-channel. As another example, if the content defined by the second meta-channel is an MSO television broadcast, a receiver may be tuned to an MSO channel indicated by the second source of content, and the video content broadcast from the MSO channel may be rendered on a television display.

Figure 5:
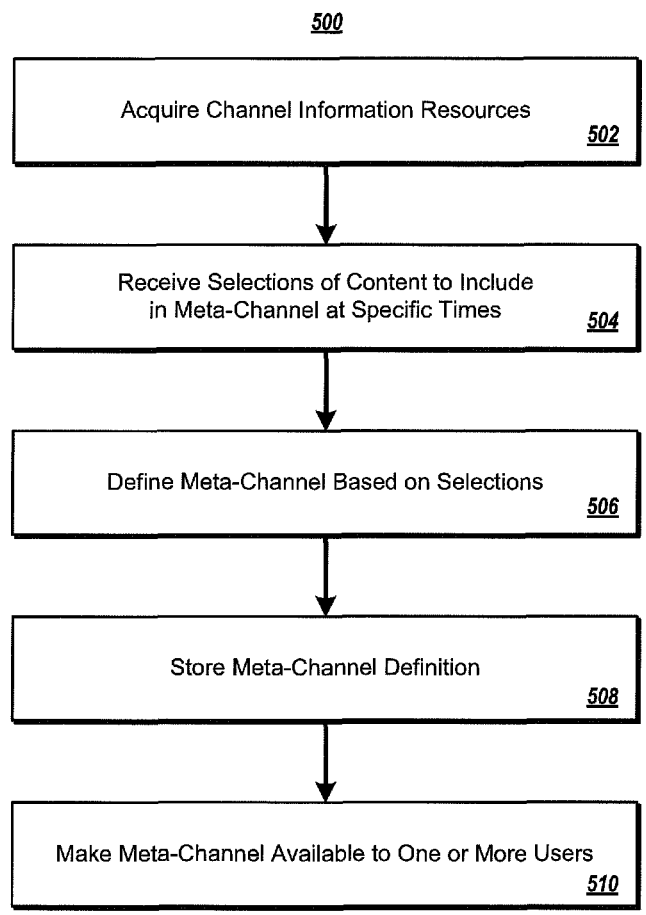

FIG. 5 is a flowchart illustrating a computer-implemented process 500 for defining a meta-channel. Briefly, the computer-implemented process 500 includes acquiring channel information resources, receiving selections of content to include in a meta-channel at specific times, defining the meta-channel based on the selections of content, storing the meta-channel definition, and making the meta-channel available to one or more users.

First, channel information resources are acquired (502). For example, a number of content entries, each including a collection of information about program content, may be acquired, such as from an EPG. For program content received from an MSO, an acquired content entry may include information on the program time, title, description, channel number, start time and stop time, etc. For program content received from an Internet video source, an acquired content entry may include, for example, the URL of the Internet video resource, a description of the video, a title of the video, a source of the video, a length of the video, etc. An acquired content entry may also include other information, such as a program's genre or classification (e.g., children's programming, soap opera, sporting event, entertainment, etc.) or rating (e.g., Nielsen rating, Internet blog rating). Acquired content entries can be categorized and organized by various attributes, such as day and time of broadcast (for MSO content), genre, rating, etc.

Next, selections of content to include in a meta-channel at specific times are received (504). For example, an end user or a "content jockey" may use a user interface to select various content entries to include in a meta-channel. An end user or content jockey may select content entries which relate to a particular category of interest (e.g., sports, a specific entertainer, etc.). A user may select content to appear on the meta-channel at specific days and times, and/or on recurring days and times. A content entry may be selected for each time slot in a meta-channel. Content from various sources (e.g., MSO channel, Internet video, on-demand content, audio music, etc.) may be selected.

The meta-channel is defined based on the selections of content (506). For example, a meta-channel definition may be created which refers to the selections of content to include in the meta-channel, and may also include an assigned meta-channel number, and optionally a user-assigned meta-channel title and description.

The meta-channel definition is stored (508). For example, the meta-channel definition may be stored in a central repository or database managed by a central meta-channel server.

The meta-channel is made available to one or more users (510). For example, for meta-channels defined by a content jockey, the meta-channels may be made available to all users or particular groups of users in the system. Meta-channels created by content jockeys may be made available for selection by end users in an end-user user interface (e.g., to allow users to subscribe to content-jockey defined meta-channels). For meta-channels defined by a specific end-user, the meta-channel may be made available to that user or may be made available to all users or particular groups of users in the system if the specific end-user decides to share the meta-channel definition.

In some examples, meta-channel information may be downloaded or cached to a meta-channel base station associated with the user. The meta-channel base station may then communicate wirelessly with one or more remote control devices, where a remote control device allows a user to select a meta-channel to view content presented on the meta-channel.

Figure 6:
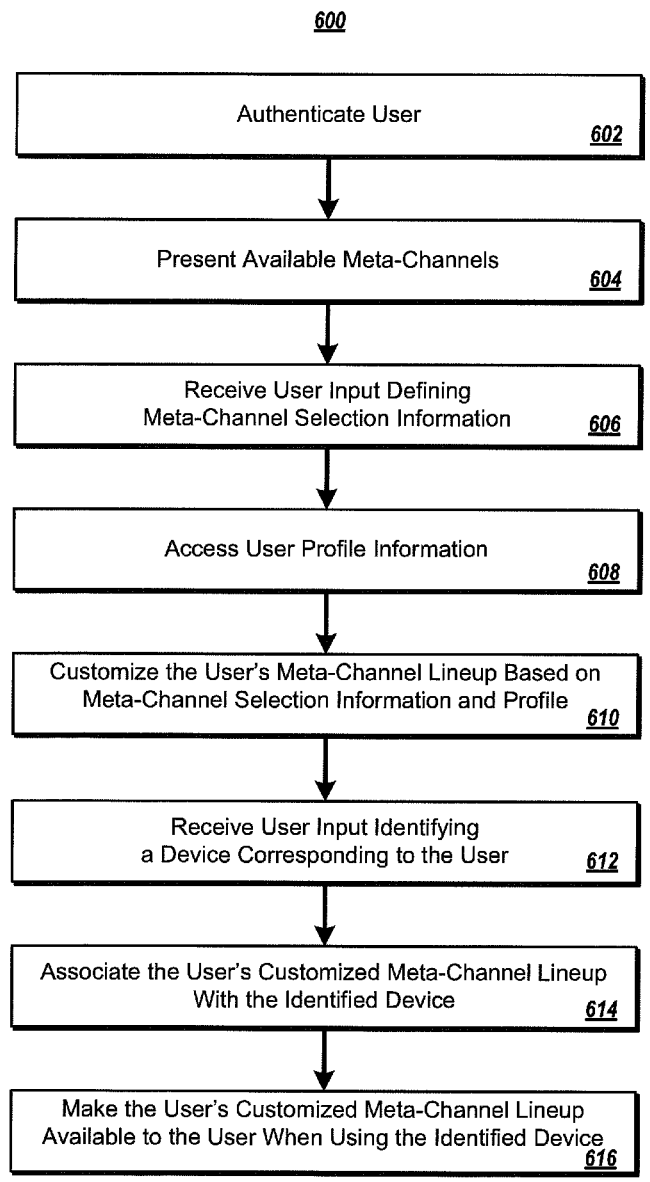

FIG. 6 is a flowchart illustrating a computer-implemented process 600 for customizing a meta-channel lineup for a user. Briefly, the computer-implemented process 600 includes authenticating a user, presenting available meta-channels, receiving user input defining meta-channel selection information, accessing user profile information for the user, customizing the user's meta-channel lineup based on the meta-channel selection information and the user's profile, receiving user input identifying a device corresponding to the user, associating the user's customized meta-channel lineup with the identified device, and making the user's customized meta-channel lineup available to the user when using the identified device.

First, a user is authenticated (602). For example, a user may provide user identification and/or a password using an interface displayed on a personal computer or by pressing buttons on a remote control device. The entered user identification and password may be verified against information that is stored in a meta-channel base station or meta-channel server (e.g., the remote control device may communicate the entered user identification and password to the meta-channel base station over a wireless connection, and the meta-channel base station may compare the entered information to stored information).

After a user is authenticated, available meta-channels are presented (604). For example, numbers corresponding to available meta-channels may be presented on a display of a remote control device. As another example, an electronic program guide, displaying available meta-channels, may be presented on a television screen. As yet another example, the available meta-channels may be presented to a user using a personal computer to manage the user's meta-channel information over a network.

After available meta-channels are presented, user input defining meta-channel selection information is received (606). The user may provide user input to a personal computer selecting the particular meta-channels in which the user is interested. The selected meta-channels are customized to the user's preference and made available to the user when using the meta-channel system to experience content. The user may rank meta-channels and may define a number/name to correspond to the selected meta-channels.

In implementations in which a user manages meta-channels using a remote control, the user may press a button on a remote control device indicating selection of a meta-channel to add to the user's customized meta-channel lineup (e.g., meta-channel "3"). The remote control device may communicate an input control command indicating the selected meta-channel number to the meta-channel base station. The meta-channel base station may forward the input control command to a meta-channel server, along with user authentication information.

Next, user profile information is accessed (608). For example, user profile information may be accessed from a repository or database based on the provided user authentification information. A user profile may include user preferences for various programming content, such as favorite sports team, locale information, political preferences, mature programming content preferences, interests, etc.

The user's meta-channel lineup is customized based on meta-channel selection information and the user's profile (610). For example, a user's profile may indicate a preference for a favorite football team. In this example, a meta-channel may define that a live football game is to be presented, but allow the selection of which game to be customized in accordance with the user's profile (e.g., the meta-channel is dynamically customized to include a live broadcast of a game involving the user's favorite football team). Other content that the user may be interested in that is airing simultaneously (e.g., on a different MSO channel) with the presented football game may be recorded onto a DVR and shown in a later time slot on the user's meta-channel.

As another example, a user's meta-channel lineup may be customized to do include a political talk show, where the included talk show matches a political preference (e.g., conservative or liberal) included in the user's profile. As a third example, a default meta-channel lineup may include mature program content. The meta-channel lineup may be customized to substitute other programming for the mature programming, if, for example, the users profile information indicates that the user is a minor, or if the user's profile information indicates that the user prefers to not receive mature programming.

Based on a user's profile information, meta-channels not currently associated with the user may be suggested to the user. For example, meta-channels related to cooking (e.g., an existing cooking-related meta-channel or a new cooking-related meta-channel created by a content jockey) may be suggested if a user profile indicates a user has an interest in cooking. As another example, meta-channels may be suggested based on a user's demographic and/or interests, based on a popularity of those meta-channels as used by other users having the same demographics and/or interests. If a user accepts a suggested meta-channel, the suggested meta-channel may be included in a list of meta-channels available to the user.

User input identifying a device corresponding to the user is received (612). For example, the user may assign his or her customized meta-channel information to a particular base station or a particular remote control. When a command is received for the particular base station or the particular remote control, the user's customized meta-channel information may be used to process the command.

The user's customized meta-channel lineup is associated with the identified device (614). For example, an association between the customized meta-channel lineup and an identified remote control device may be stored on a meta-channel base station and/or on a meta-channel server.

The user's customized meta-channel lineup is made available to the user when using the identified device (616). For example, when a user uses an identified remote control device (e.g., the user may first authenticate him or herself using the remote control device), the user's customized meta-channel lineup is presented to the user. Meta-channels associated with the user may be made available for selection, and dynamically selected content may be made available on one or more meta-channels based on the user's profile information.

Figure 7:
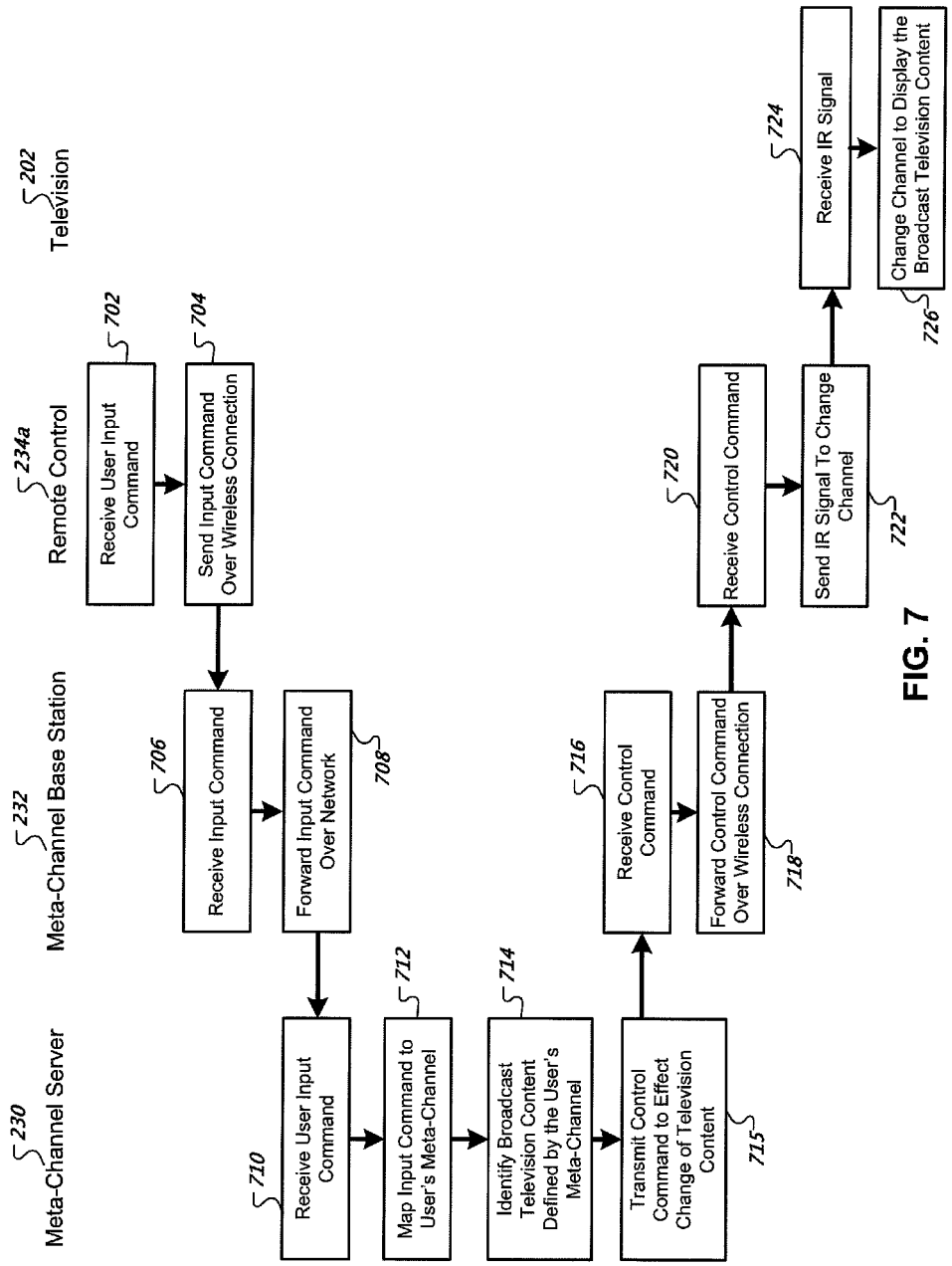

FIG. 7 is a flowchart illustrating control flow between components for rendering television broadcast content. First, a remote control receives a user input command (702). For example, a user may press a button on a remote control device, indicating for example, selection of a meta-channel number "3".

Next, the remote control sends the user input command over a wireless connection to a meta-channel base station (704). For example, the user input command may be communicated using a Z-Wave, ZigBee, or Bluetooth wireless protocol.

The meta-channel base station receives the input command (706) and the meta-channel base station forwards the input command, over a network, to a meta-channel server (708). For example, the input command may be forwarded using TCIP/IP protocols over the Internet.

The meta-channel server receives the input command (710) and maps the input command to a user's meta-channel (712). For example, an indicator for a meta-channel number "3" included in the input command may be mapped to a meta-channel included in the user's meta-channel information that has an associated channel number "3".

The meta-channel server identifies broadcast television content defined by the user's meta-channel (714). For example, the meta-channel server may access, from a stored repository, content entries associated with the selected meta-channel. A broadcast television program offered by a specific MSO channel (e.g., MSO channel number "5") may be identified as program content currently scheduled on the user's selected meta-channel (e.g., meta-channel number "3").

The meta-channel server transmits a control command to effect change of television content (715). For example, a control command may be sent, over the Internet, to the meta-channel base station, directing a television receiver to change to a channel number associated with the identified broadcast television content (e.g., MSO channel number "5").

The meta-channel base station receives the control command (716) and the meta-channel base station forwards the control command over a wireless connection to the remote control (718). For example, the control command may be transmitted from the meta-channel base station to the remote control device using a Z-Wave, ZigBee, or Bluetooth wireless protocol.

The remote control receives the control command (720), for example, over a wireless connection. The remote control sends an IR signal to a television to change the channel (722). For example, the IR signal can indicate the channel number associated with the identified television broadcast (e.g., MSO channel number "5"). In some implementations, the remote control may send an RF signal or another type of signal to the television to change the channel.

The television receives the IR signal (724) and the television changes the channel to display the broadcast television content (726). For example, a receiver may be tuned to a channel number (e.g., MSO channel number "5") associated with the identified television broadcast and indicated by the IR signal.

Figure 8:
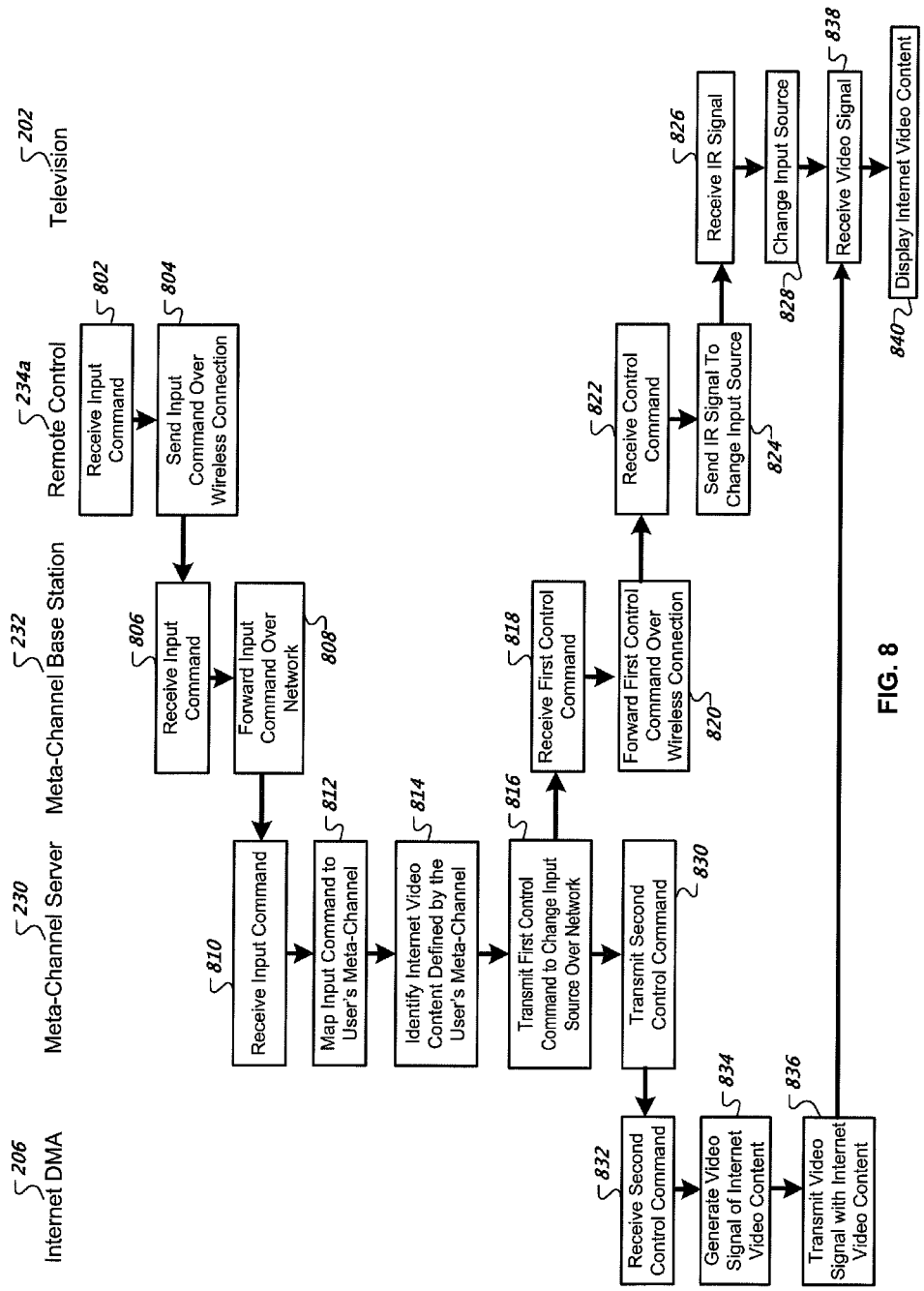

FIG. 8 is a flowchart illustrating control flow between components for rendering Internet video content. First, a remote control receives a user input command (802). For example, a user may press a button on a remote control device, indicating for example, selection of a meta-channel number "3".

Next, the remote control sends the user input command over a wireless connection to a meta-channel base station (804). For example, the user input command may be communicated using a Z-Wave, ZigBee, or Bluetooth wireless protocol.

The meta-channel base station receives the input command (806) and the meta-channel base station forwards the input command, over a network, to a meta-channel server (808). For example, the input command may be forwarded using TCIP/IP protocols over the Internet.

The meta-channel server receives the input command (810). The meta-channel server maps the input command to a user's meta-channel (812). For example, an indicator for a meta-channel number "3" included in the input command may be mapped to a meta-channel included in the user's meta-channel information that has an associated channel number "3".

The meta-channel server identifies Internet video content defined by the user's meta-channel (814). For example, the meta-channel server may access, from a stored repository, content entries associated with the selected meta-channel. An Internet video resource may be identified as program content currently scheduled on the user's selected meta-channel (e.g., meta-channel number "3").

The meta-channel server transmits a first control command, over a network, to change an input source (816). For example, a control command may be sent, over the Internet, to the meta-channel base station, directing a television to change its input source from a television video source (e.g., a cable set top box) to an Internet video source (e.g., an Internet DMA).

The meta-channel base station receives the first control command (818) and the meta-channel base station forwards the first control command over a wireless connection to the remote control (820). For example, the first control command may be transmitted from the meta-channel base station to the remote control device using a Z-Wave, ZigBee, or Bluetooth wireless protocol.

The remote control receives the first control command (822), for example, over a wireless connection. The remote control sends an IR signal to a television to change an input source (824). For example, the IR signal can indicate to change the input source to receive input from an Internet DMA.

The television receives the IR signal (826) and the television changes the input source to receive input from the Internet DMA (828). Based on the changed input source setting, the television is configured to display a video signal received from the Internet DMA.

After sending the first control command, the meta-channel server sends a second control command to the Internet digital media adapter (830). For example, the second control command may include a URL of an Internet video resource.

The Internet digital media adapter receives the second control command from the meta-channel server (832). For example, the second control command may be received over the Internet.

The Internet digital media adapter generates a video signal of the Internet video content (834). For example, a video file may be downloaded from the Internet to the Internet digital media adapter (using, for example, a URL of the Internet video resource), and the video file may be decoded. The Internet digital media adapter also may generate a video signal of the Internet video content using a video file streamed over a network or a video file downloaded from the Internet to the Internet digital media adapter prior to the change in meta-channel.

The Internet digital media adapter transmits the video signal of the Internet video content to the television (836). For example, the video signal may be communicated over a DVI (Digital Visual Interface), an HDMI (High-Definition Multimedia Interface) interface, or any other type of video interface.

The television receives the video signal (838) and displays the internet video content (840). For example, the video content may be rendered on a display screen.

Although the processes shown in FIGS. 7 and 8 have been described as being performed by particular components, similar methodologies may be applied in other implementations where different components are used to define the structure of the system, or where the functionality is distributed differently among the components. For example, although a television has been described as performing operations in FIGS. 7 and 8, other display devices (e.g., a monitor) may be used to perform the operations. In addition, other media devices may be part of a media system performing the processes shown in FIGS. 7 and 8 and provide other sources of video/audio content. Furthermore, in some implementations, the operations described as being performed by the meta-channel server may be performed by the meta-channel base station.

Figure 9:
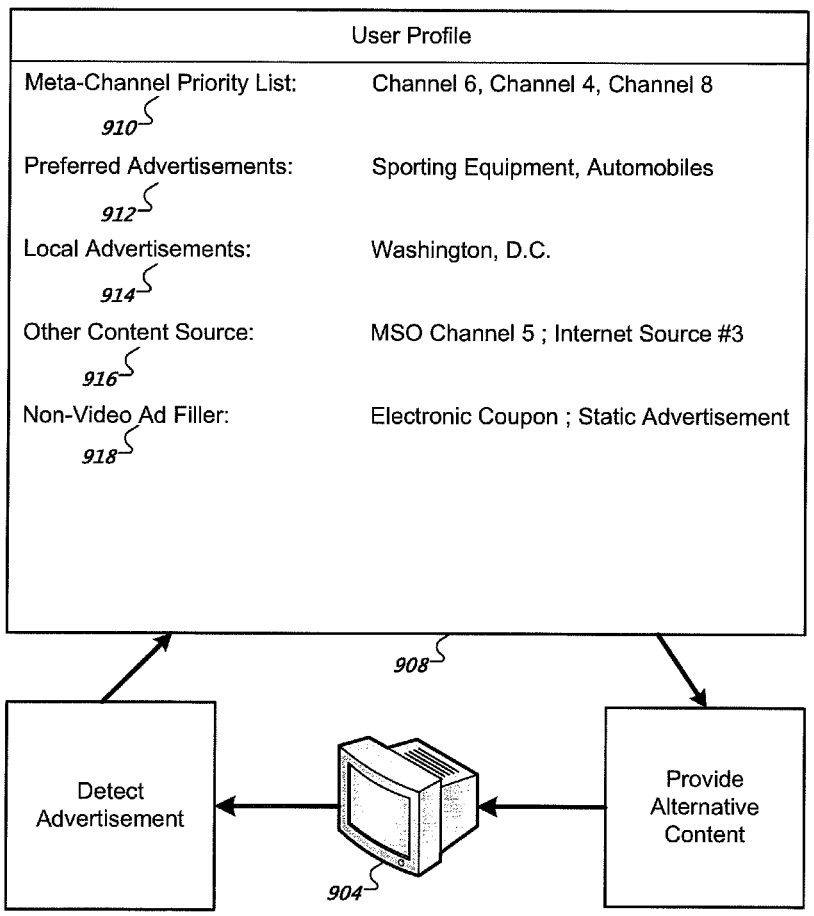

FIG. 9 is a context diagram illustrating substitution of alternative content upon detection of advertising content. A user 902 is watching video content on a television 904, and an advertisement may be detected on the television 904. For example, an advertisement may be detected using any type of technique, such as detecting an increase in volume when the advertisement starts.

In response to the detection of an advertisement, a user profile 908 associated with the user 902 is accessed. The user profile 908 can be used to determine alternative content which may be selected to be presented on the television 904 in place of the detected advertisement. For example, a meta-channel priority list profile setting 910 may include a list of meta-channels that may be used to provide alternative content in place of advertising. If an advertisement is detected on the current channel, the television may be switched to the first channel (e.g., channel with highest priority) in the meta-channel priority list 910 which is currently showing non-advertising content. For example, if an advertisement is detected on the current channel, and if an advertisement is not playing on channel 6, the television may be switched to channel 6. If an advertisement also is playing on channel 6, the television may be switched to channel 4 (assuming an advertisement is not playing on channel 4).

A user profile setting 912 may indicate that a user would prefer to see advertisements relating to a particular category of advertisements (e.g., advertisements related to sporting equipment or automobiles). If an advertisement which is not related to a user's preferred categories of advertisements is detected on the television 904, an advertisement that is related to the user's preferred categories of advertisements may be selected, possibly downloaded over a network, and presented as alternative content on the television 904.

A user profile setting 914 may indicate that a user prefers to see advertisements related to a particular geographic region (e.g., Washington, D.C.). If an advertisement which is not related to a user's preferred geographic region is detected on the television 904, an advertisement that is related to the user's preferred geographic region may be selected, possibly downloaded over a network, and presented as alternative content on the television 904.

A user profile setting 916 may include a list of alternative content sources that are not related to meta-channels. A user may choose to define an alternative content source that a user prefers to receive during limited time periods (e.g., during advertisement time periods). For instance, the user may choose to view a weather television channel during limited time periods and assign the weather television channel as an alternative content source. The user also may choose to view a particular web page or Internet content during limited time periods and assign the particular web page or Internet content as an alternative content source.

Based on the user profile setting 916, if an advertisement is detected on the current channel, the television may be switched to the first alternative content source which is currently showing non-advertising content. For example, if an advertisement is detected on the current channel, and if an advertisement is not playing on MSO channel 5, the television may be switched to MSO channel 5. If an advertisement also is playing on MSO channel 5, the television may be switched to Internet Source #3.

A user profile setting 918 may indicate non-video advertisement filler which may be used a source of alternative content. For example, if a detected advertisement is replaced with an alternative advertisement, and if the alternative advertisement is shorter in duration than the replaced advertisement, non-video filler, such as an electronic coupon or some other form of static advertisement, may be displayed on the television 904 for a time period equal to the difference in time between the replaced and alternative advertisements.

Figure 10:
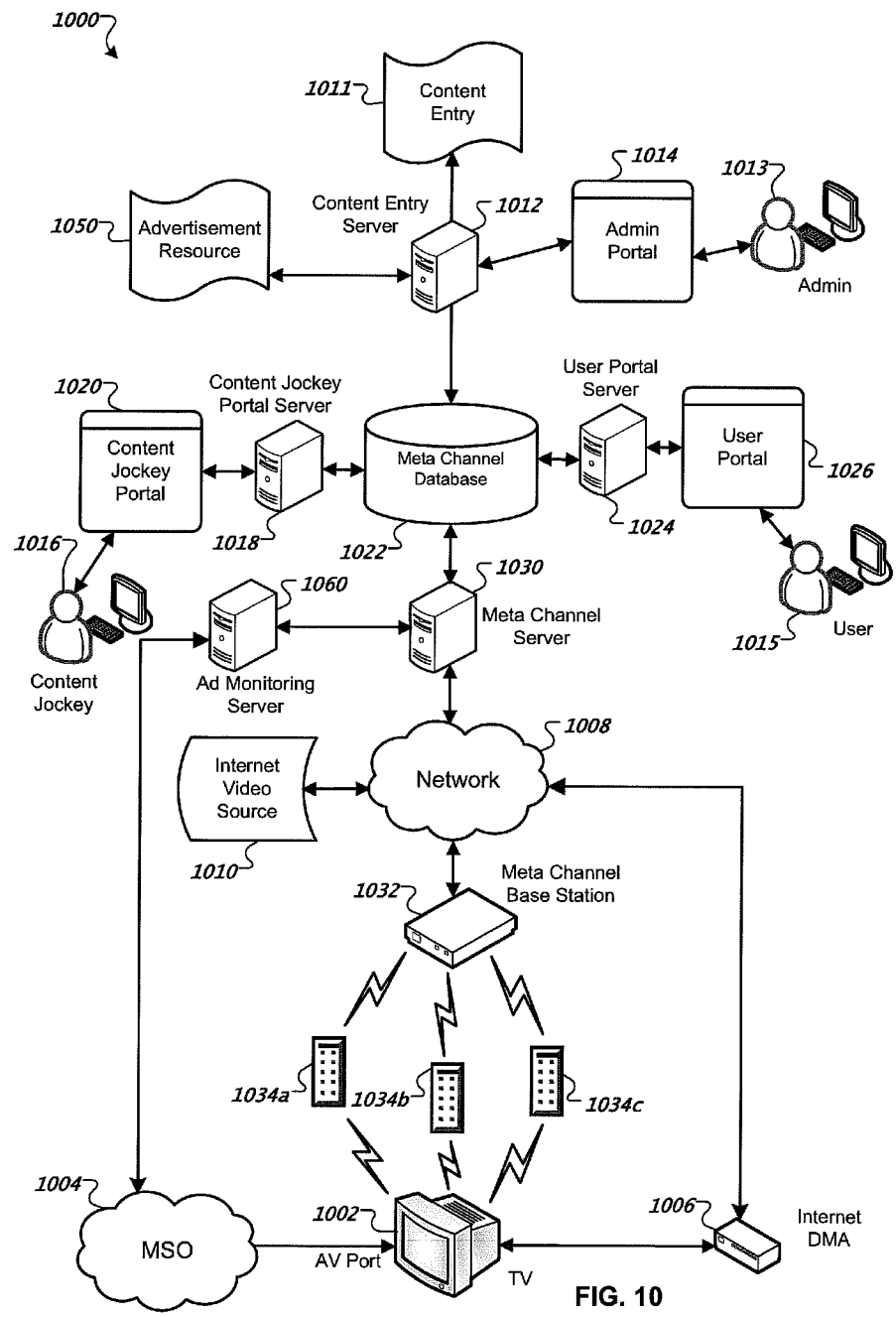
FIG. 10 illustrates a system for providing secondary content.

FIG. 10 illustrates a system diagram 1000 which is, in many respects, similar to the system diagram 200. The items 1002 to 1034 of FIG. 10 correspond to items 202 to 234 of FIG. 2, respectively. The system diagram 1000 includes an advertisement resource 1050 and an advertisement monitoring server 1060. The advertisement monitoring server 1060 may detect an advertisement (ad) and may send a signal to the meta-channel server 1030 in response to detecting the advertisement. The advertisement monitoring server 1060 may detect advertisements played on MSO channels based on a connection to the MSO broadcast content and also may detect advertisements inserted into meta-channels by content jockeys that define the meta-channels based on a connection to the meta-channel server 1030.

The meta-channel server 1030 may access advertising preferences for a user, indicating whether a user prefers local ads, prefers non-advertising content, prefers ads related to a specific geographic region, etc. The meta-channel server 1030 may identify secondary content related to the user's preferences. Secondary advertising content may be identified by referring to one or more advertising resources 1050. The advertising resource 1050 may include information about advertisements available to be selected as secondary content, such as an advertisement's category, region, publisher, etc.

The meta-channel server 1030 may be configured to send a control command to the meta-channel base station 1032, which in turn may forward the control command to a remote control 1034. In response to the control command, the remote control 1034 may send an IR signal to the television 1002, instructing the television to tune to secondary content (e.g., tune to a different MSO channel to display non-advertising content, or receive secondary advertising content from the Internet DMA 1006).

Figure 11:
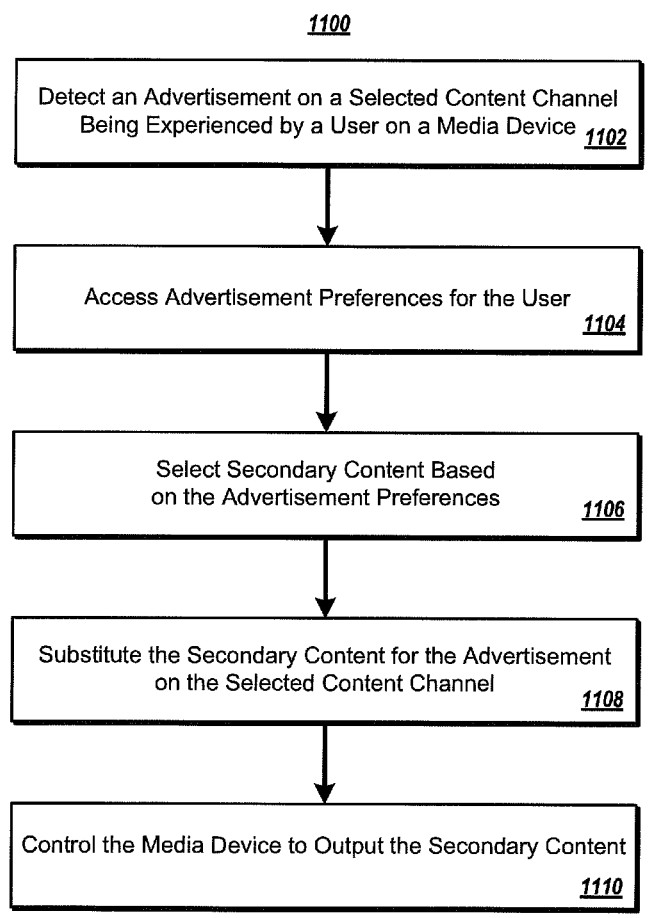

FIG. 11 is a flowchart illustrating a computer-implemented process 1100 for presenting alternate content on a media device. Briefly, the computer-implemented process 1100 includes detecting an advertisement on a selected content channel being experienced by a user on a media device, accessing advertisement preferences for the user, selecting secondary content based on the advertisement preferences, substituting the secondary content for the advertisement on the selected content channel, and controlling the media device to output the secondary content.

In further detail, when the process 1100 begins, an advertisement is detected on a selected content channel being experienced by a user on a media device (1102). For example, an advertisement monitoring server may monitor for advertisements on channels being experienced by users, and may detect an advertisement on a channel based on an increase in volume when an advertisement starts. A content channel may be any type of physical or virtual channel over which content is distributed. For example, a content channel may include any type of broadcast content channel (e.g., analog or digital television channels) in which programming is broadcast over a network. A content channel also may include any type of request-based content channels in which content is delivered (e.g., downloaded, streamed, etc.) over a network in response to user requests. A content channel further may include a meta-channel that arranges content from a variety of content sources into a virtual channel.

Advertisement preferences for the user are accessed (1104). For example, a user profile may be accessed which includes user preferences, where the user preferences indicate whether a user prefers, in place of regular advertising, local ads, non-advertising content, ads related to a specific geographic region, etc.

Secondary content is selected based on the advertisement preferences (1106). For example, if the detected advertisement is not related to a user's preferred categories of advertisements, an advertisement that is related to the user's preferred categories of advertisements may be selected. As another example, if the detected advertisement is not related to a user's preferred geographic region, an advertisement that is related to the user's preferred geographic region may be selected. As a third example, if a user's preferences indicate that a user prefers non-advertising content, a highest-priority channel on a channel priority list which is not currently presenting advertising content may be selected.

The secondary content is substituted for the advertisement on the selected content channel (1108). For instance, a meta-channel server may control a user's media system to substitute the secondary content for the advertisement currently defined by the meta-channel the user is experiencing. Substituting the secondary content for the advertisement may include updating the user's meta-channel information to at least temporarily define the secondary content in place of the content originally defined by the meta-channel. The server also may store other data that tracks the substitution of the secondary content and the channel the user was experiencing when the substitution occurred.

The media device is controlled to output the secondary content (1110). For example, if the secondary content is an MSO television channel, a receiver may be tuned to the MSO channel and the MSO broadcast content may be rendered on a display included in the media device. If the secondary content is alternative advertising content, the advertising content may be downloaded from a server to an Internet digital media adapter, decoded, and rendered on a display included in the media device. The secondary content also may be streamed over a network or downloaded from the Internet to an Internet digital media adapter prior to detection of an advertisement.

Figure 12:
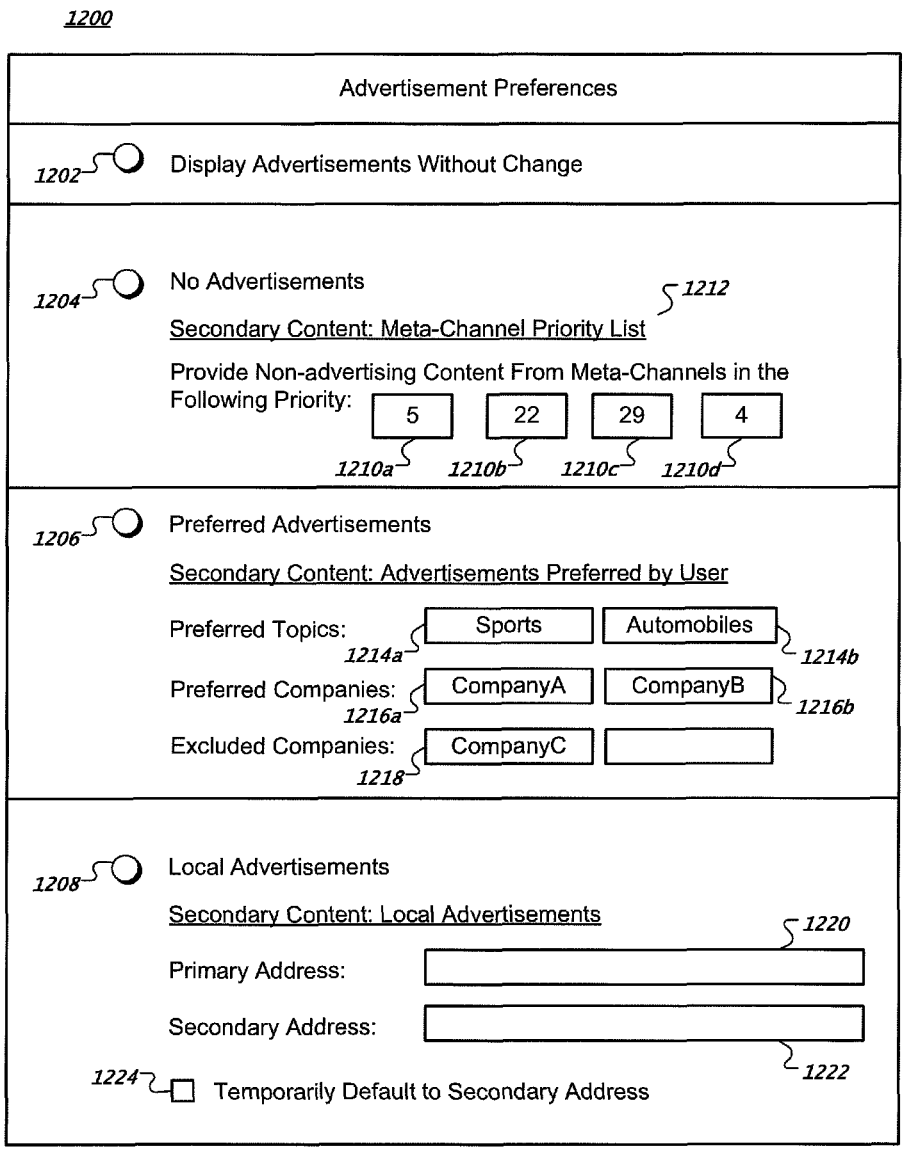
FIGS. 12 and 14 illustrate user interfaces.

FIG. 12 is an example user interface 1200 for selecting advertisement preferences. A user may select one of a set of options 1202-1208. In some implementations, the user may select more than one of the options 1202-1208. The user may select option 1202, for example, if they prefer to have advertisements displayed without change (e.g., as shown by default on a viewed television channel).

The user may select option 1204, for example, if they prefer to see non-advertising content in place of advertisements. If option 1204 is selected, a set of channels 1210*a-d* may be specified in a meta-channel priority list 1212. If an advertisement is detected while the user is viewing television content, a television channel may be switched to the first channel in the meta-channel priority list 1212 that is not currently displaying advertising content. For example, if an advertisement is detected, and the channel 1210*a* (e.g., meta-channel "5") is not currently displaying advertising content, a television channel may be switched to the channel 1210*a*. However, if the channel 1210*a* is displaying advertising, other channels in the list (e.g., 1210*b-d*) may be checked, and a television channel may be switched to the first channel (e.g., 1210*b*) which is not currently displaying advertising content.

A user may select option 1206, for example, if they prefer to see advertisements related to one or more preferred topics of advertisements. For example, the user interface 1200 displays preferred advertisements topics 1214*a-b*, relating to sports and automobiles, respectively. If an advertisement which is not related to a preferred topic of the user is detected, an advertisement that is related to the user's preferred topics of advertisements may be selected, possibly downloaded over a network, and presented as alternative content. The preferred advertisement also may be streamed over a network or downloaded from the Internet to an Internet digital media adapter prior to detection of an advertisement which is not related to a preferred topic of the user.

A user may also be able to specify one or more preferred companies (e.g., 1216*a-b*). If an advertisement which is not related to a preferred company of the user is detected, an advertisement that is related to a preferred company of the user may be selected, possibly downloaded over a network, and presented as alternative content. The preferred advertisement also may be streamed over a network or downloaded from the Internet to an Internet digital media adapter prior to detection of an advertisement which is not related to a preferred company of the user.

A user may also be able to specify one or more excluded companies (e.g., 1218). Advertisements associated with excluded companies may be excluded from being selected, even if those advertisements match other criteria (such as being related to a customer's preferred topic).

A user may select option 1208, for example, if the user prefers to see local advertisements. A user may specify his primary address in a primary address field 1220, and a secondary address in a secondary address field 1222. A user may specify that the secondary address should be used, by selecting an option 1224, if, for example, the user is on vacation. If an advertisement which is not related to a user's address is detected, an advertisement that is related to the user's address may be selected, possibly downloaded over a network, and presented as alternative content. The geographically-relevant advertisement also may be streamed over a network or downloaded from the Internet to an Internet digital media adapter prior to detection of an advertisement which is not related to a user's address.

Figure 13:
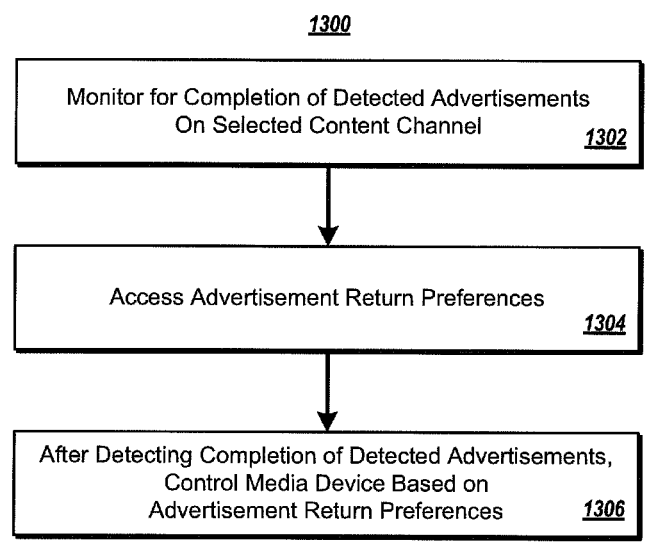

FIG. 13 is a flowchart illustrating a computer-implemented process 1300 for returning from presentation of alternative content. Briefly, the computer-implemented process 1300 includes monitoring detected advertisements on the selected content channel for completion, accessing advertisement return preferences, and after detecting completion of detected advertisements, controlling the media device based on advertisement return preferences.

In further detail, when the process 1300 begins, detected advertisements on the selected content channel are monitored for completion (1302). For example, an advertisement monitoring server may monitor for completion of advertisements on channels being experienced by users. Advertisement completion may be detected, for example, based on a decrease in volume upon the resumption of non-advertisement content.

Figure 14:
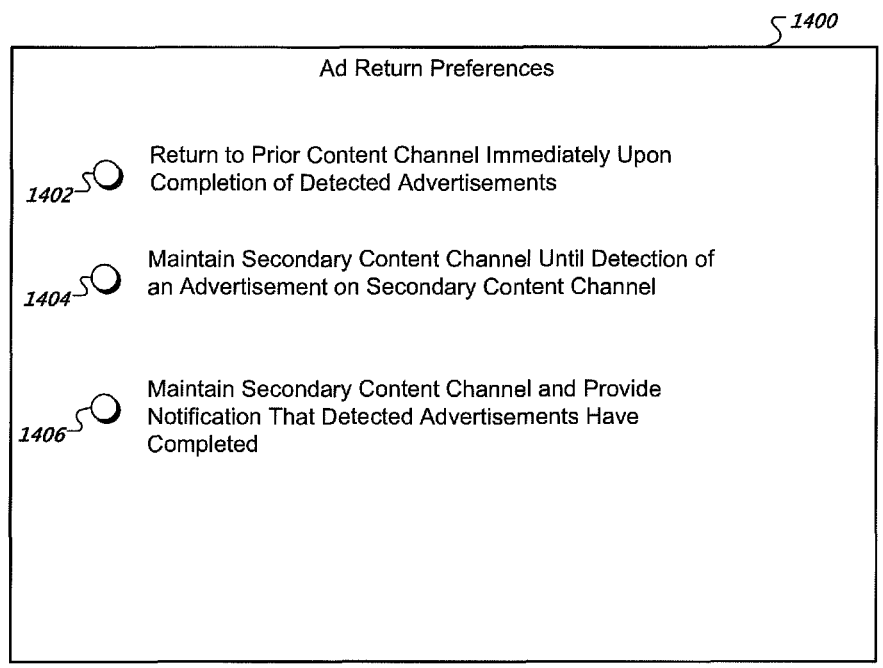

Advertisement return preferences are accessed (1304). For example, advertisement return preferences may be accessed from a user profile. A user profile may store various user-specified advertisement return preferences. For example, a user profile may store settings specified using an example user interface 1400 illustrated in FIG. 14. The user may, using the user interface 1400, specify an option 1402 to indicate a preference to return to a prior content channel immediately upon completion of detected advertisements. A user may specify an option 1404 to indicate a preference to maintain presentation of a secondary content channel until an advertisement is detected on the secondary content channel. A user may specify an option 1406 to indicate a preference to maintain presentation of a secondary content channel and to provide a notification to the user (e.g., using an onscreen message and offering the user the option to return to the prior content channel) that the detected advertisements on the prior content channel have completed.

After detecting completion of detected advertisements, the media device is controlled based on advertisement return preferences (1306). For example, if the accessed advertisement return preferences correspond to the option 1402, a television receiver may be controlled to tune to the prior content channel. If the accessed advertisement return preferences correspond to the option 1404, a television receiver is maintained as tuned to the secondary content channel. When an advertisement is detected on the secondary content channel, a television receiver may be tuned to switch to the prior content channel. If the accessed advertisement return preferences correspond to the option 1406, a notification may be displayed to the user (e.g., using an onscreen message and offering the user the option to return to the prior content channel), indicating that detected advertisements have completed on the prior content channel. A television receiver may be maintained as tuned to the secondary content channel.

Figure 15:
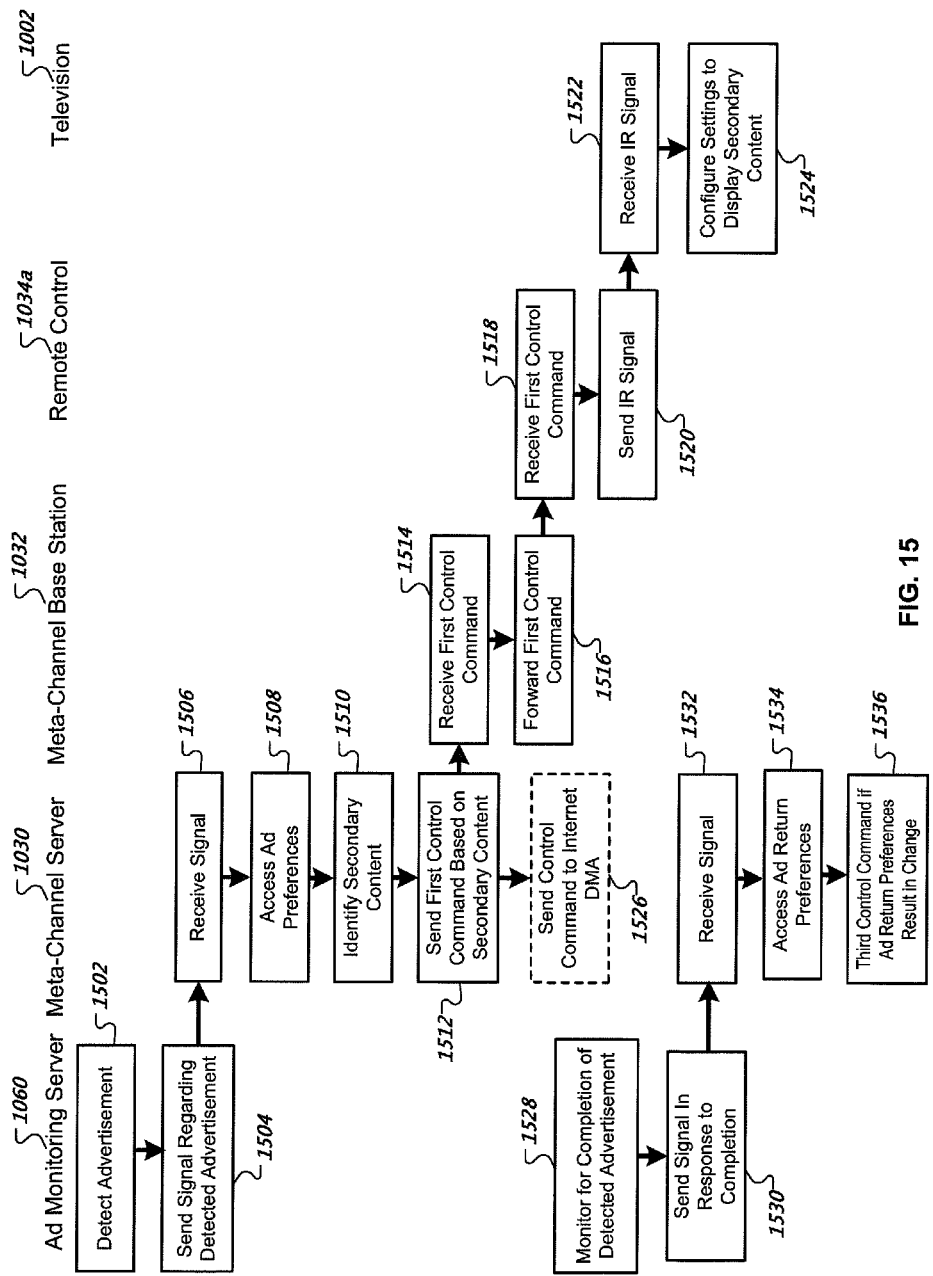

FIG. 15 is a flowchart illustrating control flow between components for rendering secondary content in response to detection of an advertisement. An advertisement monitoring server detects an advertisement on a channel being experienced by a user (1502). For example, an advertisement may be detected based on an increase in volume correlating to the start of an advertisement.

The advertisement monitoring server may send a signal indicating the detected advertisement to a meta-channel server (1504). For example, the signal may be communicated by sending a message over a network (e.g., the Internet). The meta-channel server receives the signal (1506).

The meta-channel server accesses advertisement preferences (1508). The accessed preferences may indicate whether a user prefers local ads, prefers non-advertising content, prefers ads related to a specific geographic region, etc.

The meta-channel server identifies secondary content (1510). For example, if the detected advertisement is not related to a users preferred categories of advertisements, an advertisement that is related to the user's preferred categories of advertisements may be identified as secondary content. As another example, if the detected advertisement is not related to a user's preferred geographic region, an advertisement that is related to the user's preferred geographic region may be identified as secondary content. As a third example, if a user's preferences indicate that a user prefers non-advertising content, a highest-priority channel on a channel priority list which is not currently presenting advertising content may be selected as secondary content.

The meta-channel server sends a first control command based on the identified secondary content to a meta-channel base station (1512). For example, the first control command may be sent over a network, such as the Internet.

The meta-channel base station receives the first control command (1514) and forwards the first control command to a remote control device (1516). For example, the first control command may be sent to the remote control device over a wireless connection.

The remote control device receives the first control command (1518) and sends an IR signal to a television (1520). The television receives the IR signal (1522) and configures one or more settings to display the secondary content (1524). For example, if the secondary content is to be received from an MSO channel, a television receiver may be tuned to the MSO channel. As another example, if the secondary content is advertising content received from a network server, the television may be configured to receive video content from an Internet digital media adapter.

After sending the first control command, the meta-channel server optionally sends a second control command to an Internet digital media adapter (1526). The second control command is sent if the secondary content is provided by an Internet video or a custom advertisement served by a network server. Upon receiving the second control command, the secondary content may be downloaded, decoded, and transmitted to the television for display. In some examples, upon receiving the second control command, the Internet digital media adapter may begin streaming the secondary content over a network or may outputting secondary content that has been previously downloaded and pre-transcoded.

After detecting an advertisement, the advertisement monitoring server monitors for completion of detected advertisements (1528). For example, completion of an advertisement may be detected based on a decrease in volume as non-advertising content resumes.

Upon detection of the completion of detected advertisements, the advertisement monitoring server sends a signal to the meta-channel server indicating advertisement completion (1530). For example, the signal may be sent in a message over a network (e.g., the Internet).

The meta-channel server receives the advertisement completion signal (1532). The meta-channel server accesses advertisement return preferences. For example, advertisement return preferences may be accessed from a user profile.

The meta-channel server may send a third control command to the meta-channel base station if advertisement return preferences result in a change of input source for the television (1534). The signal may, in turn, be forwarded to the remote control, and the remote control may send a corresponding signal to the television.

For example, if the accessed advertisement return preferences indicate that the user prefers to return to a prior content channel immediately upon completion of detected advertisements, the third control command may direct a television receiver to tune to the prior content channel. If the accessed advertisement return preferences indicate that the user prefers to maintain presentation of secondary content until an advertisement is detected on a secondary content channel, a television receiver is maintained as tuned to the secondary content channel. When an advertisement is detected on the secondary content channel, a third control command may be sent directing the television to switch to the prior content channel. If the accessed advertisement return preferences indicate that the user prefers to maintain presentation of a secondary content channel and to receive a notification that the detected advertisements on the prior content channel have completed, the third control command may direct a television to display a notification (e.g., using an onscreen message and offering the user the option to return to the prior content channel) indicating that detected advertisements have completed on the prior content channel.

Although the processes shown in FIG. 15 have been described as being performed by particular components, similar methodologies may be applied in other implementations where different components are used to define the structure of the system, or where the functionality is distributed differently among the components. For example, although a television has been described as performing operations in FIG. 15, other display devices (e.g., a monitor) may be used to perform the operations. In addition, other media devices may be part of a media system performing the processes shown in FIG. 15 and provide other sources of video/audio content. Furthermore, in some implementations, the operations described as being performed by the meta-channel server may be performed by the meta-channel base station.

Although implementations have been described in the context of substituting secondary content for advertising content, other implementations may include substituting secondary content for types of content other than advertising. For example, the system may detect content interruptions (e.g., news breaks, loss of service, poor quality, device failure, etc.) and substitute secondary content for the content interruptions based on user preferences. The system also may detect when a programming schedule is modified by a content provider and substitute secondary content in response to the modifications. For instance, the system may detect that a live sporting event is running long and the content provider has delayed broadcasting of a desired show to account for the extended length of the live sporting event. The system may select secondary content to replace the live sporting event, monitor for completion of the live sporting event, and then control the media system to display the delayed broadcast of the desired show.

Figure 16:
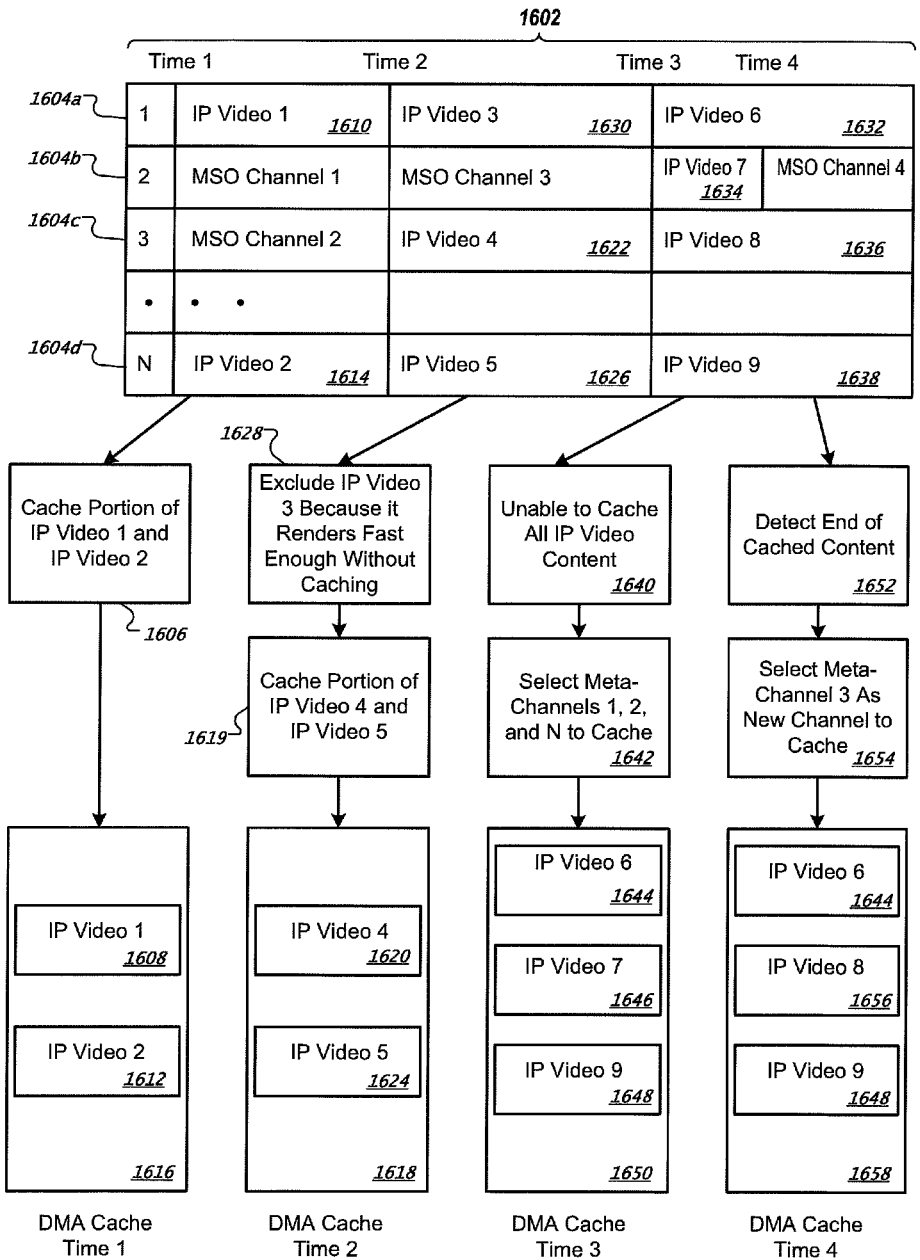
FIG. 16 is a contextual diagram illustrating a process of enabling a media system to render content.

FIG. 16 is a contextual diagram illustrating a process of enabling a media system to render content. A guide 1602, which may be an electronic program guide, displays information about content defined by one or more meta-channels 1604a-d. The guide 1602 may display a schedule of content to be presented on a particular day of the week (e.g., Sunday).

Meta-channels 1604a-d each identifies content entries to be presented on a respective meta-channel, and indicate an order in which the content entries are to be presented on that meta-channel. For internet video content, a portion of the video content may be cached (e.g., in a cache associated with a digital media adapter), to enable responsive channel switching to a meta-channel scheduled to present Internet video content. Cached content also may be pre-transcoded to a faster video codec to improve response time. For instance, the cached content may be pre-transcoded using a video codec that enables the cached content to be rendered in less than half a second.

For example, as indicated by an action 1606, a portion 1608 of the video content "IP video 1" (described by content entry 1610) and a portion 1612 of the video content "IP video 2" (described by content entry 1614) may be cached and pre-transcoded in a digital media adapter cache 1616 at a time "time 1". The portion of the video content cached may be determined by based on the time needed to render the video content without caching. For instance, the video content "IP video 1" (described by content entry 1610) may take one minute to download and decode using a video codec before the video content "IP video 1" is ready to be displayed to a user and the video content "IP video 2" (described by content entry 1614) may take two minutes to download and decode using a video codec before the video content "IP video 2" is ready to be displayed to a user. In this case, the portion 1608 of the video content "IP video 1" cached may correspond to one minute of video viewing time (e.g., the time needed to download the video content "IP video 1" and decode video content "IP video 1" using a video codec) and the portion 1612 of the video content "IP video 2" cached may correspond to two minutes of video viewing time (e.g., the time needed to download the video content "IP video 2" and decode video content "IP video 2" using a video codec). As such, only a relatively small portion of "IP video 1" (e.g., one minute worth of IP Video 1) and only a relatively small portion of "IP video 2" (e.g., two minutes worth of IP Video 2) needs to be cached in the media adapter cache 1616. This may be advantageous because the amount of storage needed by the media adapter cache 1616 may be reduced and the media adapter cache 1616 still may be able to store a relatively small portion of a large number of IP videos.

If, during the timeframe between 'time 1" and "time 2", a user switches to the meta-channel 1604a, the cached and pre-transcoded portion 1608 of "IP video 1" may be played while the original version of "IP video 1" is transcoded and prepared for viewing by a background process. A transition may occur from the rendering of the cached and pre-transcoded portion 1608 to the rendering of the original version of "IP video 1". Similarly, if a user switches to the meta-channel 1604d, the cached and pre-transcoded portion 1612 of "IP video 2" may be played while the original version of "IP video 2" is transcoded and prepared for viewing.

At a time "time 2", it may be determined that the scheduled play times for "IP video 1" and "IP video 2" have passed, and consequentially, the portions 1608 and 1612 may be removed from the digital media adapter cache 1616, as illustrated by a digital media adapter cache 1618. As indicated by an action 1619, and before "time 2" is reached, a portion 1620 of video content "IP video 4" (described by content entry 1622) and a portion 1624 of video content "IP video 5" (described by content entry 1626) may be cached and pre-transcoded in the digital media adapter cache 1618. A size of the portions 1620 and 1624 of the video content cached may be determined by based on the time needed to render the video content without caching.

As indicated by an action 1628, video content "IP video 3" (described by content entry 1630) may be excluded from caching because it renders fast enough without caching. For example, the video content "IP video 3" may be processable so that it is ready for viewing in a time that is less than a threshold time (e.g., less than a threshold time of a half second). If, during a time between "time 2" and 'time 3", a user switches to the meta-channel 1604a, an original version of "IP video 3" may be rendered.

At a time "time 3", four IP videos (e.g., "IP video 6", "IP video 7", "IP video 8", and "IP video 9", described by content entries 1632-1638, respectively) are scheduled to be presented. As indicated by an action 1640, it may be determined that it is not possible to cache portions of all scheduled Internet videos. For example, it may be determined that there is not enough space available in the digital media adapter cache 1618, and/or it may be determined that there is not enough time to download and transcode portions of all scheduled Internet videos.

If it is determined that it is not possible to cache portions of all scheduled Internet video content, a subset of meta-channels scheduled to display Internet video content may be selected, and portions of Internet video content scheduled to be played on meta-channels included in the subset may be cached and pre-transcoded. For example, an approach may be used to maximize the number of cached portions. In this example, a subset of meta-channels may be determined by identifying combinations of the identified meta-channels for which the digital media adapter cache has the ability to store, prior to "time 3", portions of the content scheduled to be presented on each of the meta-channels included in the combination. A combination of the identified meta-channels that includes the largest number of channels may be selected from among the identified combinations. For instance, as indicated by an action 1642, a combination including meta-channels 1, 2, and "N" may be identified as a combination having the highest number of channels, and portions 1644-1648 (of video content "IP video 6", "IP video 7", and "IP video 9", respectively) may be pre-transcoded and cached in a digital media adapter cache 1650.

As another example, a subset of meta-channels may be selected by accessing historical viewing patterns that indicate one or more categories of content the user has experienced during past time frames that are similar to the particular time frame. The content defined by each of the identified meta-channels may be compared to the accessed historical viewing patterns and a subset of the identified meta-channels that the user is most likely to experience during the particular time frame may be determined based on the comparison of the content defined by each of the identified meta-channels to the accessed historical viewing patterns. For example, a user may have previously watched comedy-related videos during a time period starting at "time 3", and IP videos 6, 8, and 9 may include comedy-related content, whereas IP video 7 may include crime drama content. Therefore, corresponding meta-channels 1604a, 1604c, and 1604d may be included in a subset of selected meta-channels while meta-channel 1604b may be excluded from a subset of selected meta-channels.

As yet another example, a subset of meta-channels may be selected by determining a meta-channel being experienced by the user at the time of selecting, accessing information that identifies one or more meta-channels the user typically selects subsequent to experiencing the meta-channel being experienced by the user at the time of selecting, comparing the accessed information to the identified meta-channels, and determining a subset of the identified meta-channels that the user is most likely to experience during the particular time frame based on the comparison of the accessed information to the identified meta-channels. In other words, and for example, if the user is currently watching meta-channel 1604b, and if historical data indicates that the user typically selects either meta-channels 1604a or 1604c after watching meta-channel 1604b, meta-channels 1604a and 1604c may be included in the subset of meta-channels.

As indicated by an action 1652, at a time "time 4", the end time of the content "IP video 7" may be detected (or, as another example, the ending of the playing of the portion 1646 may be detected), which may allow for the clearing of the portion 1646 from the digital media adapter cache 1650. In response to the clearing of the portion 1646, and as indicated by an action 1654, a meta-channel (e.g., meta-channel 1604c) may be selected as a new channel to cache. A portion 1656 of the previously uncached content "IP video 8" may be cached, as illustrated by a digital media adapter cache 1658. In some implementations, the digital media adapter cache 1650 may clear a portion of content stored in the digital media adapter cache 1650 as soon as that portion is finished playing, even though the original video associated with the cached portion is still being played. Clearing the cached portion while the original video is still being played may allow the digital media adapter cache 1650 to cache additional content at an earlier time than if the cached portion was not cleared until the original video finished playing.

Figure 17:
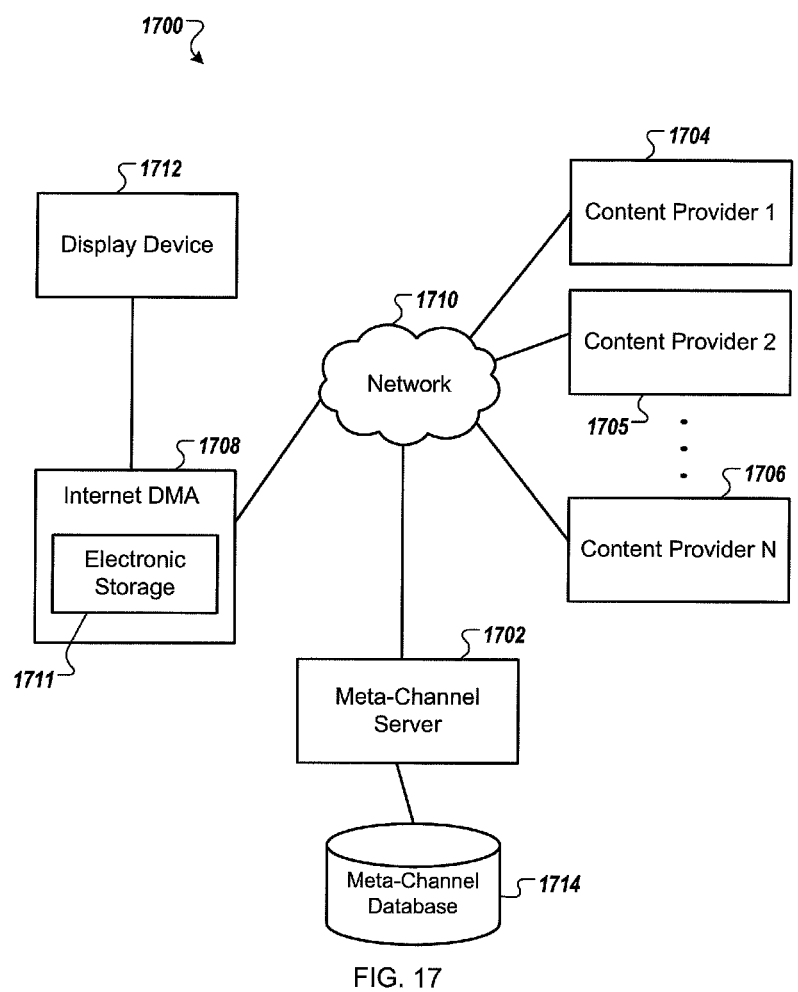
FIG. 17 illustrates a system for rendering content.

FIG. 17 illustrates a system 1700 for rendering content. The system 1700 includes a meta-channel server 1702, content providers 1704-1706, and an Internet digital media adapter (DMA) 1708, all connected to a network 1710. The Internet DMA 1708 may receive Internet video or other content over the network 1710, from content providers 1704-1706. The content providers 1704-1706 may provide content using a public network source (e.g., content available over the Internet) or using a content delivery network (CDN). A CDN is a network of cooperating devices optimized (e.g., for performance, scalability, and cost efficiency) to deliver content, such as video or audio content, for example, to client devices, possibly incurring a fee. Video content may include video files, video feeds (e.g., podcasts), or other content such as BitTorrent files. The network 1710 may be one or more public or private, wired or wireless networks, such as the Internet, or may be a Session Initiated Protocol (SIP) network such as the PsipTN network offered by TelTel.

Received video content can be stored in electronic storage 1711 included in the Internet DMA 1708. Received video content can be presented on a display device 1712 (e.g., television screen, computer monitor) connected to the Internet DMA 1708. The meta-channel server 1702 can communicate, over the network 1710, meta-channel information including a list of user-defined meta-channels, to the Internet DMA 1708 or to other devices such as a meta-channel base station (not shown). Meta-channel information may be stored in and retrieved from a meta-channel database 1714.

Figure 18:
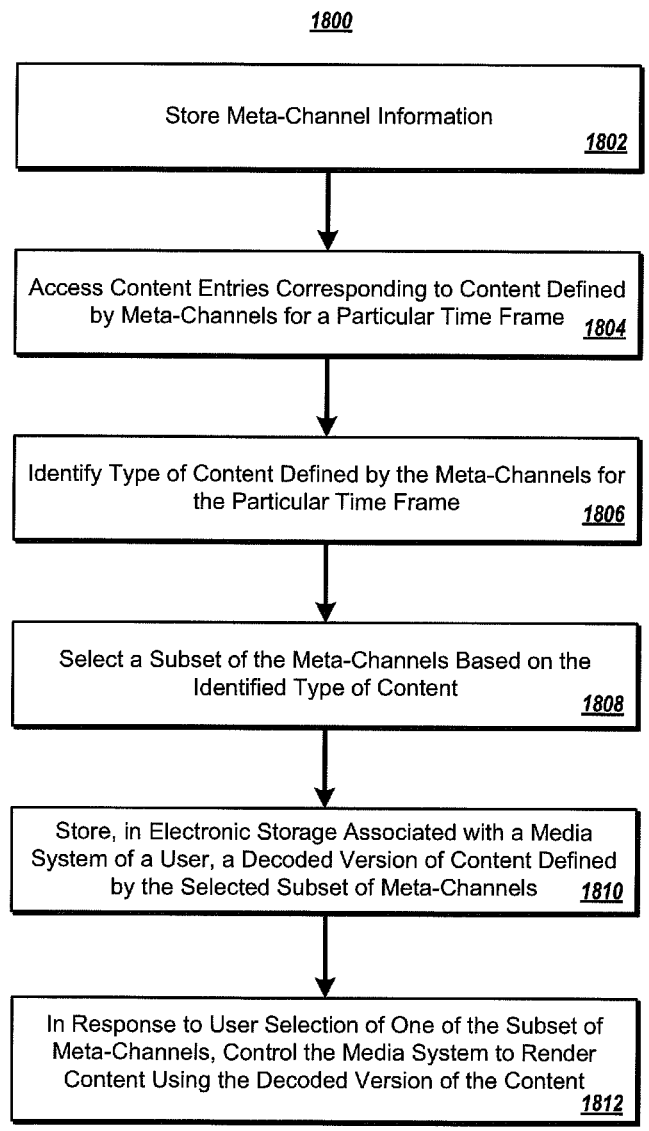

FIG. 18 is a flowchart illustrating a computer-implemented process 1800 for enabling a media system to render content. Briefly, the computer-implemented process 1800 includes storing meta-channel information, accessing content entries corresponding to content defined by meta-channels for a particular time frame, identifying one or more types of content defined by the meta-channels for the particular time frame, selecting a subset of the meta-channels based on the identified types of content, storing, in electronic storage associated with a media system of a user, a decoded version of content defined by the selected subset of meta-channels, and in response to user selection of one of the subset of meta-channels, controlling the media system to render content using the decoded version of the content.

In further detail, when the process 1800 begins, meta-channel information is stored in electronic storage of a media system (1802). For example, meta-channel information may define multiple meta-channels, where each meta-channel may refer to content entries and define an order in which content entries are to be presented on a particular meta-channel. A content entry relates to content available from a content provider, such as a television broadcaster or an Internet video source. Meta-channel information may be stored in a central repository and may be transferred to and cached on a meta-channel base station residing, for example, in a user's home.

After meta-channel information is stored, content entries corresponding to content defined by each of the multiple meta-channels for a particular time frame are accessed from the meta-channel information stored in the electronic storage (1804), where the accessed content entries include at least one content entry that relates to a first type of content broadcast by a content provider at a specific time and at least one content entry that relates to a second type of content made available, over a network, by a content provider in response to user requests. For example, content entries may be accessed from a meta-channel base station and/or from a central repository or server. The particular time frame may be an upcoming time (e.g., 5 p.m.) or time period (e.g., 5 p.m. to 7 p.m.), and the accessed content entries may correspond to content scheduled to be presented on one or more meta-channels at or during the particular time frame. Content entries may refer to, in general, various types of content, such as broadcast television content received from a specific local or cable television provider, Internet video, audio CD music, or content from an "on-demand" cable television service, to name a few examples. The first type of content may be broadcast, for example, by a cable television channel. The second type of content may be, for example, Internet video.

After content entries are accessed, a type of content defined by each of the multiple meta-channels for the particular time frame is identified, based on the accessed content entries (1806). For example, at 5 p.m., a first meta-channel may be scheduled to present an MSO broadcast and a second meta-channel may be scheduled to present an Internet video.

Figure 19:
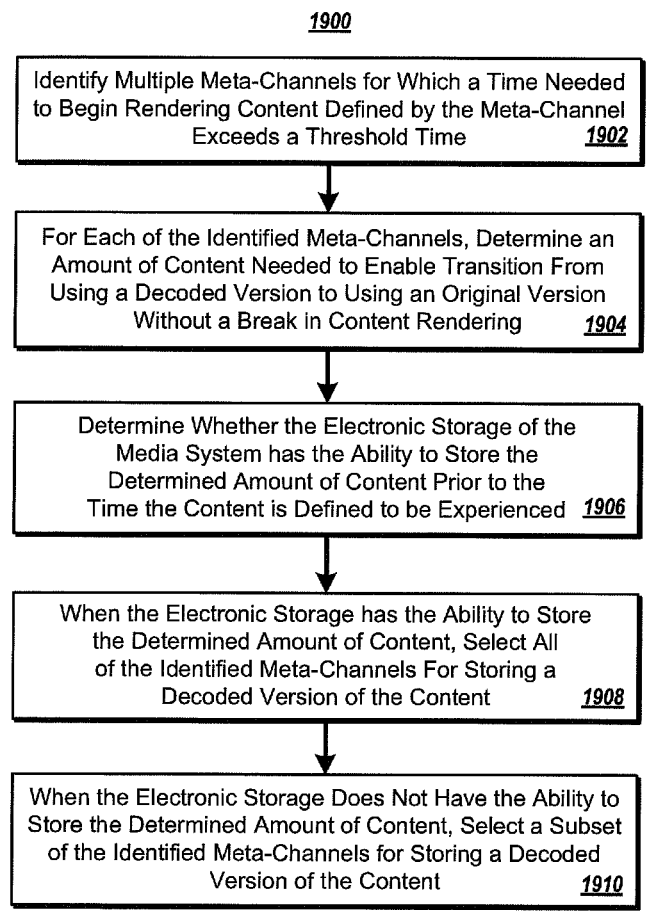

After a type of content is identified for each meta-channel, a subset of the meta-channels is selected based on the identified type of content (1808). For example, meta-channels scheduled to present Internet video content may be selected. In further detail, FIG. 19 illustrates a computer-implemented process 1900 for selecting a subset of meta-channels based on an identified type of content. Briefly, the computer-implemented process 1900 includes: identifying multiple meta-channels for which a time needed to begin rendering content defined by the meta-channel exceeds a threshold time; determining, for each of the identified meta-channels, an amount of content needed to enable transition from using a decoded version to using an original version without a break in content rendering; determining whether the electronic storage of the media system has the ability to store the determined amount of content prior to the time the content is defined to be experienced; when the electronic storage has the ability to store the determined amount of content, selecting all of the identified meta-channels for storing a decoded version of the content; and when the electronic storage does not have the ability to store the determined amount of content, selecting a subset of the identified meta-channels for storing a decoded version of the content.

Figure 20:
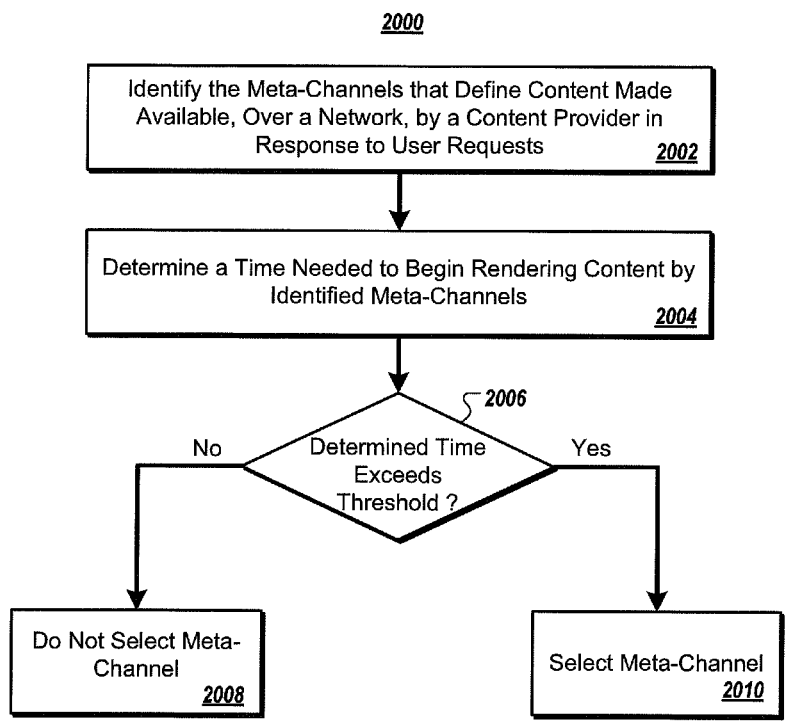

In further detail, when the process 1900 begins, multiple meta-channels for which a time needed to begin rendering content defined by the meta-channel exceeds a threshold time are identified (1902). For example, FIG. 20 illustrates an example process 2000 for identifying meta-channels for which a time needed to begin rendering content exceeds a threshold time. When the process 2000 begins, meta-channels are identified, where the meta-channels define content made available, over a network, by a content provider in response to user requests (2002). For example, multiple meta-channels may be identified that are scheduled to present Internet video content during a particular time frame.

After meta-channels are identified, a time needed to begin rendering content by the identified meta-channels is determined (2004). For example, for each video, an amount of time needed to transcode the video content using a video codec may be determined.

Next, it is determined whether the time needed to begin rendering content exceeds a threshold time (2006). For example, the time needed to begin rendering content may be compared to a threshold time of one-half second.

If the determined time needed to begin rendering content does not exceed a threshold time, the meta-channel is not selected (2008). If the determined time needed to begin rendering content exceeds a threshold time, the meta-channel is selected (2010).

Returning to FIG. 19, for each of the identified meta-channels, an amount of content needed to enable transition from using a decoded version to using an original version without a break in content rendering is determined (1904). For example, the amount of content may be selected so that the play time of the amount of content is equal to or greater than the amount of time needed to transcode the remaining portion of a video not including the determined amount of content. As a more specific example, if an entire Internet video takes 5 seconds to transcode, the amount of content may be determined to be slightly less than the first 5 seconds (e.g., 4.9 seconds) of content. In other words, 4.9 seconds may be the amount of time needed to transcode the remaining portion of the Internet video starting 4.9 seconds into the video. A size of content may be determined based on a determined amount of time needed to begin rendering the content.

Next, it is determined whether the electronic storage of the media system has the ability to store the determined amount of content prior to the time the content is defined to be experienced (1906). For example, it may be determined whether the aggregated amount of content for the identified meta-channels exceeds an amount of available storage in electronic storage associated with the media system. For example, the aggregated amount of content may be 100 megabytes, and the amount of available storage in the media system may be 80 megabytes (in which case, it may be determined that the media system does not have the ability to store the determined amount of content). As another example, it may be determined whether the media system has the ability to store the determined amount of content by determining whether an amount of time remaining until a start of the particular time frame exceeds an amount of time needed for the media system to download, transcode, and store the determined amount of content for each of the identified meta-channels.

When the electronic storage has the ability to store the determined amount of content, all of the identified meta-channels are selected for storing a decoded version of the content (1908). In contrast, when the electronic storage does not have the ability to store the determined amount of content, a subset of the identified meta-channels are selected for storing a decoded version of the content (1910).

For example, a subset of the identified meta-channels may be selected by identifying combinations of the identified meta-channels for which the electronic storage associated with the media system of the user has the ability to store, prior to the particular time frame, the determined amount of content for each of the meta-channels included in the combination. In this example, a combination of the identified meta-channels that includes the largest number of channels may be selected from among the identified combinations. For instance, if a media system's electronic storage has 20 megabytes of space available, and if determined amounts of content for first, second, and third meta-channels are 10, 10, and 20 megabytes, respectively, the first and second meta-channels may be selected as being included in a subset of identified meta-channels, and the third meta-channel may be excluded from the subset of identified meta-channels.

As another example, a subset of the identified meta-channels may be selected by accessing historical viewing patterns that indicate one or more categories of content the user has experienced during past time frames that are similar to the particular time frame. The content defined by each of the identified meta-channels may be compared to the accessed historical viewing patterns and a subset of the identified meta-channels that the user is most likely to experience during the particular time frame may be determined based on the comparison of the content defined by each of the identified meta-channels to the accessed historical viewing patterns. In other words, and for example, a user may have previously watched comedy videos during the particular time frame, and meta-channels scheduled to present comedy-related content during the particular time frame may be selected as being included in the subset of identified meta-channels, and meta-channels scheduled to present other categories of content (e.g., crime drama, news content, sports content, etc.) may be excluded from the subset of identified meta-channels. In one implementation of the example described above, the first and second meta-channels, which each define content that requires 10 megabytes of storage, may each be related to a news category of content, and the third meta-channel, which defines content that requires 20 megabytes of storage, may be related to a comedy category of content. In this implementation, the third meta-channel may be selected as being included in a subset of identified meta-channels based on the historical viewing patterns of the user that indicate the user prefers comedy-related content during the particular time frame, despite the selection resulting in fewer meta-channels having IP video content cached.

As yet another example, a subset of the identified meta-channels may be selected by determining a meta-channel being experienced by the user at the time of selecting, accessing information that identifies one or more meta-channels the user typically selects subsequent to experiencing the meta-channel being experienced by the user at the time of selecting, comparing the accessed information to the identified meta-channels, and determining a subset of the identified meta-channels that the user is most likely to experience during the particular time frame based on the comparison of the accessed information to the identified meta-channels. In other words, and for example, if the user is currently watching meta-channel "4", and if historical data indicates that the user typically selects either meta-channels "5" or "8" after watching meta-channel "4", meta-channels "5" and "8" may be included in the subset of identified meta-channels (that is, they are included the identified meta-channels).

Figure 21:
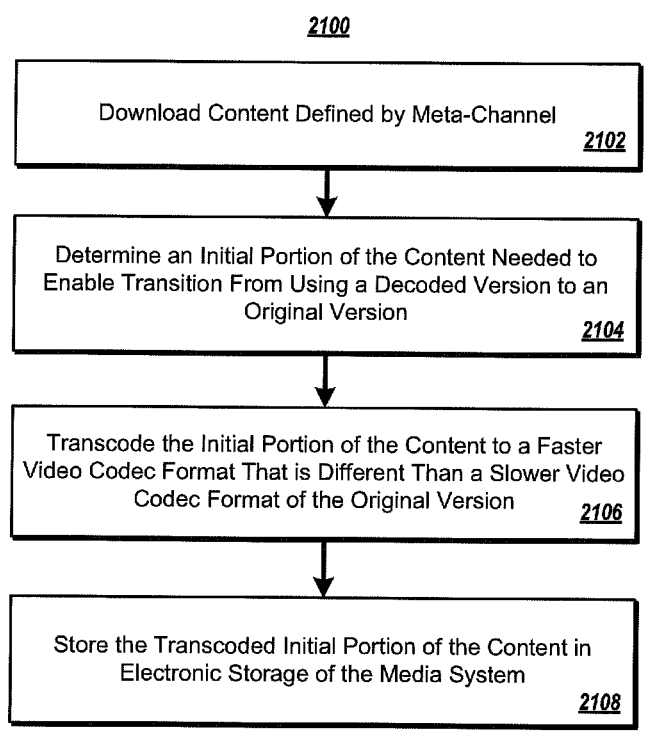

Returning to FIG. 18, after a subset of meta-channels is selected, a decoded version of a portion of content (e.g., a relatively small portion) defined by each of the selected subset of meta-channels is stored in electronic storage associated with a media system of a user (1810). For example, FIG. 21 illustrates an example process 2100 for storing content. When the process 2100 begins, a portion of content defined by a meta-channel is downloaded (2102). For example, Internet video content may be downloaded, using, for example, the Internet or a content delivery network.

After the portion of content is downloaded, an initial portion of the content needed to enable transition from using a decoded version to an original version is determined (2104). For example, the original version of the content as made available by a content provider may be encoded using a video codec. The original video codec may be slower than a faster, different video codec. A time needed to begin rendering the content using the original video codec format may be determined and an initial portion of the content may be selected to pre-transcode to the faster video codec based on the determined time needed to begin rendering the content using the slower video codec format. In other words, a length of time for the initial portion may be selected so that playback of the initial portion rendered lasts for a time that is equal to or greater than the time needed to begin rendering the content using the original, slower video codec format.

After an initial portion is determined, the initial portion of the content is transcoded to a faster video codec format that is different than a slower video codec format of the original version (2106). The faster video codec may allow the initial portion to be started for viewing within a relatively short period of time (e.g., 0.5 seconds). By transcoding the initial portion of the content from a slower video codec to a faster video codec, a delay from when the content is selected to when the content is played back to the user may be reduced and made comparable to a delay of flipping between broadcast television channels (e.g., reduced to a delay of half a second or less).

After the initial portion is transcoded, the transcoded initial portion of the content is stored in electronic storage of the media system (2108). For example, the initial portion may be stored in electronic storage associated with a digital media adapter.

Figure 22:
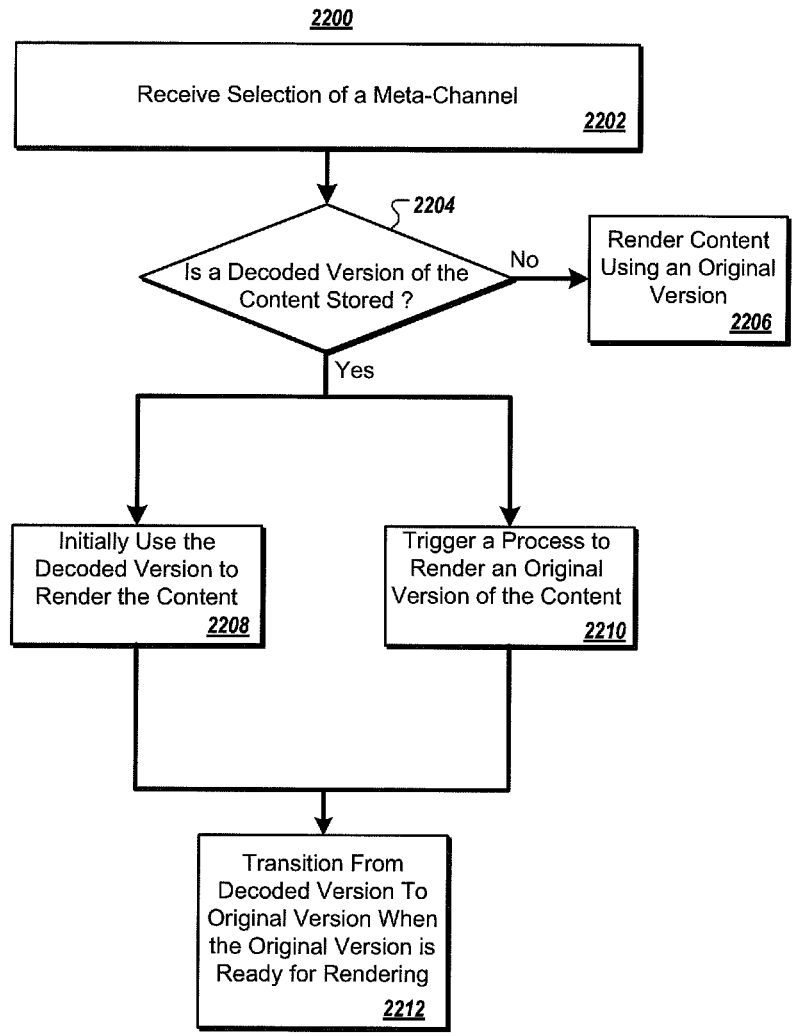

Returning to FIG. 18, in response to user selection of one of the subset of meta-channels, the media system is controlled to render content using the decoded version of the content (1812). For example, FIG. 22 illustrates an example process 2200 for controlling a media system. Performing the process 2200 may, for example, enable a channel switching time for switching to a selected meta-channel playing Internet video to be comparable to a channel switching time for switching to a meta-channel playing a live television broadcast. The process 2200 begins with the receiving of a selection of a meta-channel (2202). For example, the user may select a meta-channel by selecting a button on a remote control device.

After selection of a meta-channel is received, it is determined whether a decoded version of the content is stored (2204). For example, it may be determined whether a decoded version of video content is stored in electronic storage of the media system as a result of performing the process 2100. The decoded version of the content may include only an initial portion of the content.

If a decoded version of the content is not stored, content is rendered using an original version (2206). The original version may be transcoded and then rendered. A decoded version might not be stored, for example, if an original version of the content is able to be transcoded and rendered within a short period of time (e.g., 0.5 seconds), or if the electronic storage of the media system does not have the ability to store all of the IP video content defined by the meta-channels and the content was not selected for caching.

If a decoded version of the content is stored, the decoded version is initially used to render the content (2208). The decoded version may use a faster video codec, and use of the decoded version may allow rendering of content to begin, for example, in less than half a second.

In parallel with the rendering of the decoded version, a process is triggered to render an original version of the content (2210). For example, while the decoded version is being rendered, the original version of the content may be transcoded and prepared for viewing in a background process. In some implementations, the background process also may include downloading the original version of the content.

Next, a process is transitioned from using a decoded version to an original version when the original version is ready for rendering (2212). For example, when the transcoding of the original version and the rendering of the decoded version is complete, a process may be initiated to render the original version, where the rendering of the original version begins at the same location in the content as where the rendering of the decoded version ended, such that the transitioning from using the decoded to an original version appears visually seamless to the user.

Figure 23A:
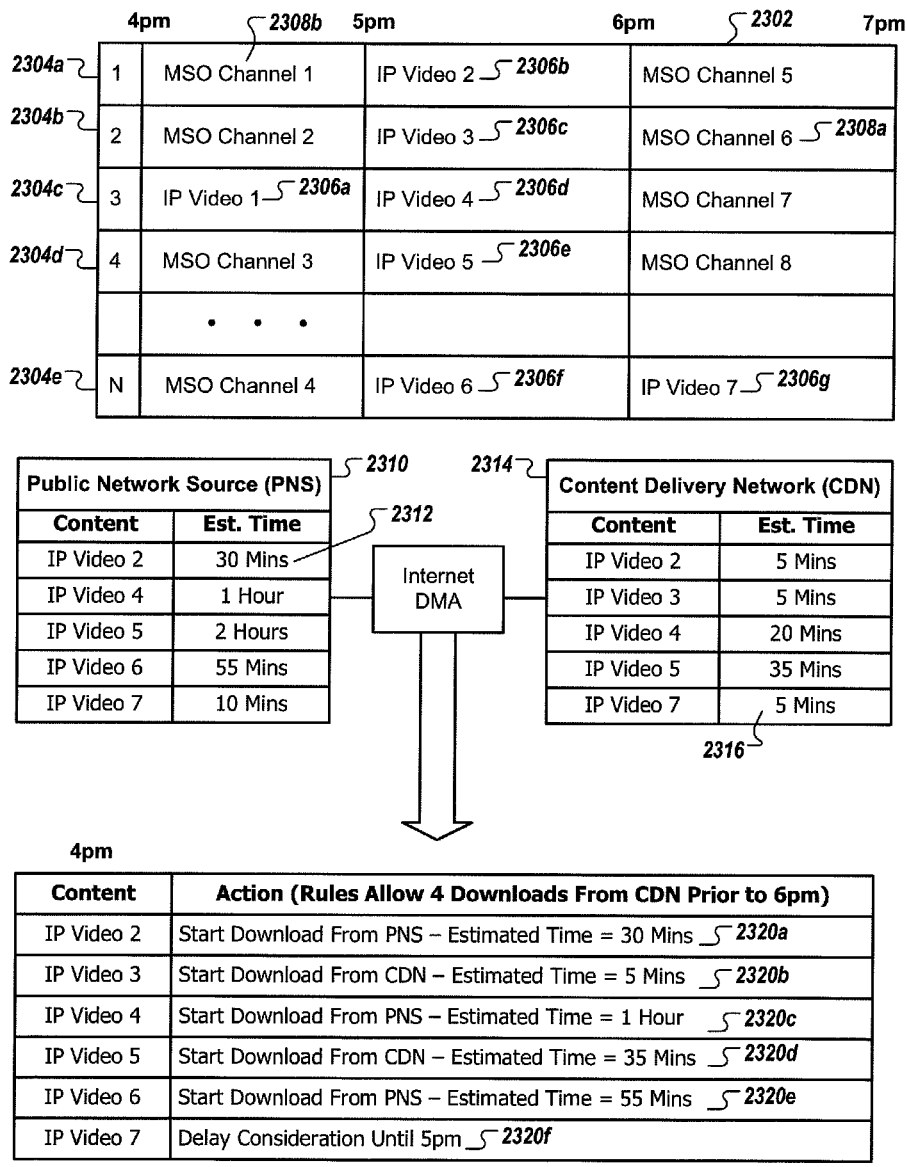

FIGS. 23A-C are contextual diagrams illustrating the downloading of content for viewing using a media system. A meta-channel guide 2302 may be displayed, for example, on a television screen. The guide 2302, which may be an electronic program guide, may display information about content defined by one or more meta-channels 2304a-e. The guide 2302 may display a schedule of content to be presented on a particular day of the week (e.g., Monday) or on a particular calendar day (e.g., Oct. 1, 2008).

Meta-channels 2304a-e each identifies content entries to be presented on a respective meta-channel, and indicate an order in which the content entries are to be presented on that meta-channel. For example, as displayed in the guide 2302, a content entry 2306a indicates that an IP video "1" is scheduled to be presented on the meta-channel 2304c from 4 p.m. to 5 p.m. Additionally, content entries 2306b-f indicate that IP videos "2" to "6" are scheduled to be played on meta-channels 2304a-e, respectively, from 5 p.m. to 6 p.m., and a content entry 2306g indicates that an IP video "7" is scheduled to be presented on the meta-channel 2304e from 6 p.m. to 7 p.m.

The guide 2302 indicates that content other than IP videos is scheduled. For example, a content entry 2308a indicates that content received from an MSO channel 6 is scheduled to be presented on the meta-channel 2304b from 6 p.m. to 7 p.m. As another example, a content entry 2308b indicates that content received from an MSO channel 1 is scheduled to be presented on the meta-channel 2304a from 4 p.m. to 5 p.m.

Network-based videos, such as IP videos, may be downloaded (and possibly transcoded) before the videos are scheduled to be presented, such that if a user selects a meta-channel scheduled to present a video, the video content is already downloaded and decoded and ready to be played. If network-based videos are not downloaded prior to their scheduled start time, and if a user selects a meta-channel scheduled to present network-based video content, a delay may occur while waiting for the video to be downloaded and transcoded.

Videos may be downloaded, for example, using a public network source (PNS), such as a public source of content found on the Internet, or using a content delivery network (CDN). A CDN is a network of cooperating devices optimized (e.g., for performance, scalability, and cost efficiency) to deliver content, such as video or audio content, for example, to client devices. A CDN may charge a fee for use of its download services, whereas a PNS may offer download services without a fee.

Estimates of time needed to download video content from different sources may be computed. For example, estimates of time needed to download a video from a PNS and from a CDN can be computed. For example, a table 2310 illustrates download time estimates for downloading various videos using a PNS (e.g., an estimate 2312 of 30 minutes has been computed for downloading IP video "2" from a PNS). A table 2314 illustrates download time estimates for downloading various videos using a CDN (e.g., an estimate 2316 of 5 minutes has been computed for downloading IP video "7" from a CDN). As shown in tables 2310 and 2314, download times using a CDN are generally less than download times using a PNS. An estimated time for downloading IP video "3" from a PNS is not displayed because, for example, the IP video "3" is not available from a PNS (the IP video "3" is, as indicated by the table 2314, available through a CDN). An estimated time for downloading IP video "6" from a CDN is not displayed because, for example, the IP video "6" is not available from a CDN (the IP video "6" is, as indicated by the table 2310, available from a PNS).

After estimated amounts of time needed to download network-based videos from multiple sources have been computed, estimated times may be compared to the amount of time remaining until the network-based videos are scheduled to be played. Based on the comparisons, an initial source to download each video may be selected. For example, if the estimated time needed to download a video from a PNS is less than the time remaining until the video is scheduled to be played, the PNS may be selected as the initial download source for that video. If the estimated time needed to download a video from the PNS is more than the time remaining until the video is scheduled to be played, a CDN may be selected as the initial download source for that video.

For example, as indicated in the guide 2302, the IP videos "2" through "6" are each scheduled to be played at 5 p.m. At 4 p.m., the 30 minute estimated time needed to download IP video "2" from a PNS may be compared to the 60-minute time remaining until the IP video "2" is scheduled to be played. Since the estimated time needed to download IP video "2" from a PNS is less than the time remaining until the IP video "2" is scheduled to be played, an action 2320a may be performed to start download of the IP video "2" from a PNS. Similarly, since the 55 minute estimated time needed to download IP video "6" from a PNS is less than the 60 minute time remaining until the IP video "6" is scheduled to be played, an action 2320e may be performed to start download of the IP video "6" from the PNS. As another example, since the 1 hour estimated time needed to download IP video "4" from a PNS is equal to (i.e., fits within) the 60 minute time remaining until the IP video "4" is scheduled to be played, an action 2320c may be performed to start download of the IP video "4" from the PNS.

At 4 p.m., the 2 hour estimated time needed to download IP video "5" from a PNS may be compared to the 60-minute time remaining until the IP video 5" is scheduled to be played. Since the estimated time needed to download IP video "5" is more than the time remaining until the IP video "5" is scheduled to be played, an action 2320d may be performed to start download of the IP video "5" from a CDN. If an estimate for download time from a PNS is not available, such as for IP video "3" in this example, an action 2320b may be performed to start download of the IP video "3" from a CDN (since it may be unknown whether download from a PNS may complete in time). As another example, a download of IP video "3" may be started from a CDN because IP video "3" is not available from a PNS.

If the time remaining until a video is scheduled to be played exceeds a threshold (e.g., 90 minutes), consideration of an initial download source may be delayed. For example, IP video "7" is scheduled to be played at 6 p.m. At 4 p.m. (e.g., 120 minutes before the scheduled start time), it may be determined, as indicated by action 2320f, to delay consideration of an initial download source for IP video "7" until 5 p.m.

One or more rules may apply to the downloading of content from a CDN. For example, a rule may limit the number of downloads a particular user may make from a CDN. For example, at 4 p.m. on the day corresponding to this example, the user may be allowed 4 downloads from a CDN. Other rules may define which content to download if one or more rules limit the download of content from a CDN. Rules are discussed in more detail below.

Progress of downloads may be monitored, to determine whether downloads are proceeding so that downloads will complete in time to enable viewing of the downloaded videos without interruption. For example, as illustrated in FIG. 23B, at 4:15 p.m., progress of the download of IP videos "2" through "6" may be analyzed. For IP video "2", an updated estimated download time remaining has been computed as 25 minutes. The 25-minute estimated download time remaining is still less than the 45-minute time remaining until the IP video "2" is scheduled to be played, so download of IP video "2" from the PNS is maintained, as indicated by an action 2322a. Similarly, for IP video "6", an updated estimated download time remaining has been computed as 40 minutes. The 40-minute estimated download time remaining is still less than the 45-minute time remaining until the IP video "6" is scheduled to be played, so download of IP video "6" from the PNS is maintained, as indicated by an action 2322e.

For IP video "4", an updated estimated download time remaining has been computed as 50 minutes. The 50-minute estimated download time remaining is more than the 45-minute time remaining until the IP video "4" is scheduled to be played, so download of the IP video "4" from the PNS is stopped, and download of the IP video "4" from a CDN is started, as indicated by an action 2322c. The entire IP video "4" may be downloaded from the CDN, or the portion of the IP video "4" not downloaded from the PNS may be downloaded from the CDN.

Download of IP video "3" is detected as complete at 4:15 p.m., as indicated by an action 2322b. For IP video "5", an updated estimated download time remaining has been computed as 20 minutes. The 20-minute estimated download time remaining is still less than the 45-minute time remaining until the IP video "5" is scheduled to be played, so download of IP video "6" from the CDN is maintained, as indicated by an action 2322*d*.

One or more rules may indicate whether downloads from a CDN are allowed. For example, at 4 p.m., rules indicate that 4 downloads from a CDN are allowed before 6 p.m. However, if, as in this example, 2 CDN downloads are started at 4 p.m., at 4:15 p.m., the rules may indicate that 2 additional downloads are allowed from a CDN before 6 p.m. (e.g., because 2 allowed CDN downloads were used). Also, for example, due to a starting of a download of IP video "5" from a CDN at 4:15 p.m., one or more rules (e.g., as checked when the next progress monitoring occurs, such as at 4:30 p.m.) may indicate that only one additional download may be allowed from a CDN before 6 p.m.

As shown in FIG. 23B, at 4:30 p.m., progress of downloads may continue to be monitored and one or more actions may be performed in response to the monitoring. For example, for IP video "2", an updated estimated download time remaining has been computed as 20 minutes. The 20-minute estimated download time remaining is still less than the 30-minute time remaining until the IP video "2" is scheduled to be played, so download of IP video "2" from the PNS is maintained, as indicated by an action 2324*a*.

Similarly, download time remaining estimates of 5 minutes, 10 minutes, and 30 minutes have been computed for IP videos "4", "5", and "6", respectively. Each of the 5, 10 and 30 minute download time remaining estimates fit within the 30-minute time remaining until the videos "4", "5", and "6" are scheduled to be played, so the downloads of videos "4", "5", and "6" are maintained, as indicated by actions 2324*b*-*d*, respectively.

As shown in FIG. 23C, at 4:45 p.m., progress of downloads may continue to be monitored and one or more actions may be performed in response to the monitoring. For example, for IP video "2", an updated estimated download time remaining has been computed as 25 minutes. The 25-minute estimated download time remaining is more than the 15-minute time remaining until the IP video "2" is scheduled to be played, so download of IP video "2" from the PNS is stopped, and download of IP video "2" from a CDN is started, as indicated by an action 2326*a*. For IP video "4" and IP video "5", downloads have been detected as complete, as indicated by actions 2326*b* and 2326*c*, respectively.

For IP video 6, an updated estimated download time remaining has been computed as 20 minutes, which is more than the 15-minute time remaining until the IP video "6" is scheduled to be played. The download of the IP video "2" from the CDN uses up the last remaining allowable CDN download, as specified by one or more rules, so the download of the IP video "6" is maintained from the PNS, as indicated by an action 2326*d*. In other examples, the user may be allowed to choose whether IP video "2" or IP video "6" is downloaded from the CDN. A user may also be allowed to increase a service level (e.g., by paying a fee) to enable more downloads from a CDN.

Other criteria may be used to determine which IP video to download from a CDN. For example, a video with a lesser estimated download time may be selected. As another example, historical viewing patterns may suggest that a meta-channel associated with an IP video may be more likely to be selected by a user than a meta-channel associated with a different IP video, and the IP video associated with the more-likely-to-be-selected meta-channel is selected to be downloaded from the CDN.

If an IP video scheduled to be presented on a meta-channel is followed by a second IP video, the order of the presentation of the two IP videos can be reversed on the meta-channel. For example, IP video "7" follows IP video "6" on meta-channel 2304*e* (e.g., meta-channel "N"). The order of the presentations of IP video "7" and IP video "6" may be reversed, for example, if download of IP video "6" may not complete before the time when IP video "6" is scheduled to be played (e.g., 5 p.m.) and if a download of IP video "7" may complete before the time when IP video "6" is scheduled to be played. For example, an action 2326*e* indicates that download of IP video "7" from a PNS has been started, and the estimated download time remaining (e.g., 10 minutes) indicates that the download of IP video "7" may complete before 5 p.m. The estimated download time remaining of 20 minutes for IP video "6", however, indicates that the download of IP video "6" may not complete before the scheduled start time of IP video "6" (e.g., 5 p.m.).

As shown in FIG. 23C, at 5 p.m., progress of downloads may continue to be monitored and one or more actions may be performed in response to the monitoring. The downloads of IP videos "2" and "7" have been detected as completed, as indicated by actions 2328*a* and 2328*b*, respectively. The action 2328*a* also indicates that IP video "2" will be played if the user selects meta-channel "1". The action 2328*b* indicates that IP video "7" will be played if the user selects meta-channel "N". Similarly, actions 2328*c*-*e* indicate that an IP video "2", "3", or "4" will be played if a corresponding meta-channel (e.g., meta-channels "2", "3", and "4", respectively) is selected.

As indicated by an action 2328*f*, an updated estimated download time remaining of 5 minutes has been computed for IP video "6". As discussed above, since IP video "6" is not ready for playing at its scheduled start time of 5 p.m., IP video "6" has been "swapped" with IP video "7", such that IP video "7" is now scheduled to be presented at 5 p.m., and will be played if the user selects meta-channel "N" (as indicated by action 2328*b*).

Figure 24:
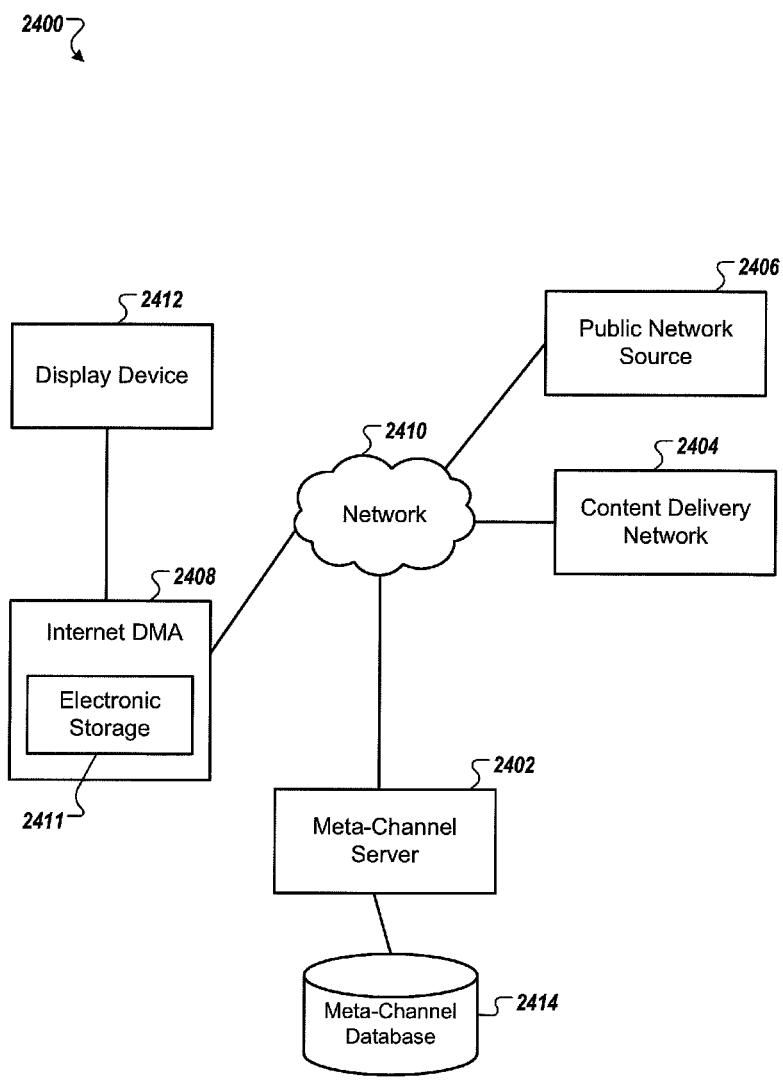
FIG. 24 illustrates a system for downloading content.

FIG. 24 illustrates a system 2400 for downloading content. The system 2400 includes a meta-channel server 2402, a content delivery network (CDN) 2404, a public network source (PNS) 2406, and an Internet digital media adapter (DMA) 2408, all connected to a network 2410. The Internet DMA 2408 may receive Internet video or other content over the network 2410, from either the CDN 2404 or the PNS 2406. Video content may include video files, video feeds (e.g., podcasts), or other content such as BitTorrent files. Received video content can be stored in electronic storage 2411 included in the Internet DMA 2408. Received video content can be presented on a display device 2412 (e.g., television screen, computer monitor, etc.) connected to the Internet DMA 2408.

The PNS 2406 is a source of content that is available free of charge, such as content available over the Internet. A CDN 2404 is a network of cooperating devices optimized (e.g., for performance, scalability, and cost efficiency) to deliver content, such as video or audio content, for example, to client devices, possibly incurring a fee. Generally, download speeds from a CDN are faster than download speeds from a PNS. The network 2410 may be one or more public or private, wired or wireless networks, such as the Internet, or may be a Session Initiated Protocol (SIP) network such as the PsipTN network offered by TelTel.

The meta-channel server 2402 can communicate, over the network 2410, meta-channel information including a list of user-defined meta-channels, to the Internet DMA 2408 or to other devices such as a meta-channel base station (not shown). Meta-channel information may be stored in and retrieved from a meta-channel database 2414.

Figure 25:
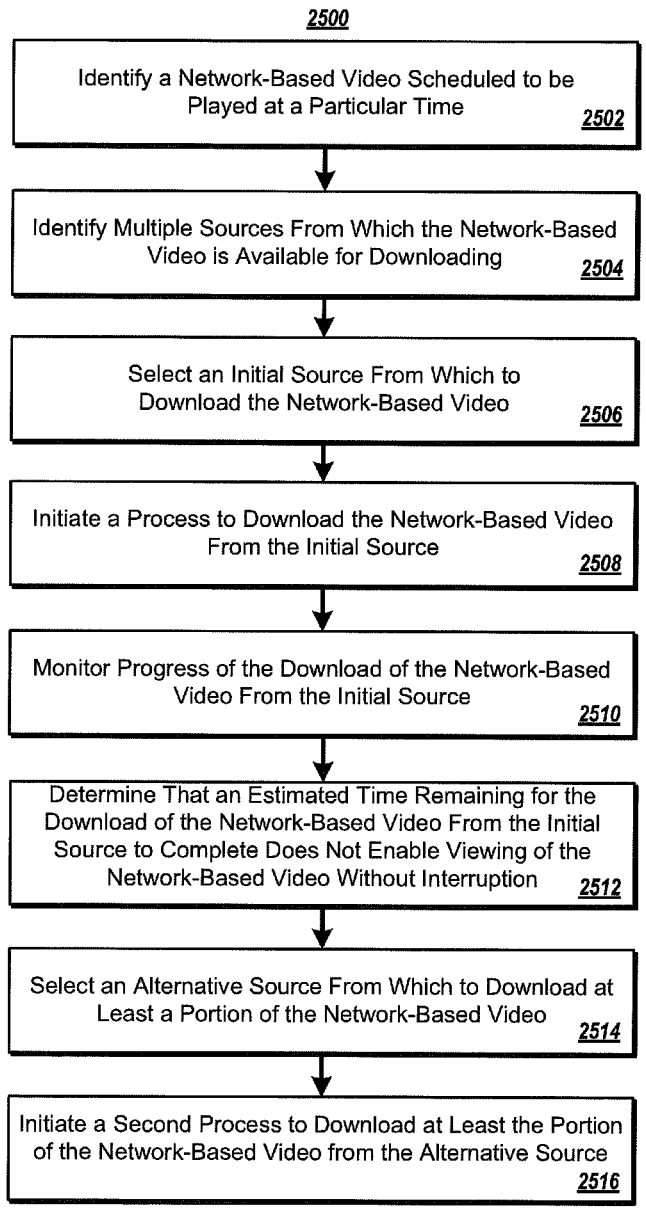

FIG. 25 is a flowchart illustrating a computer-implemented process 2500 for downloading content for viewing using a media system. Briefly, the computer-implemented process 2500 includes identifying a network-based video scheduled to be played at a particular time, identifying multiple sources from which the network-based video is available for downloading, selecting an initial source from which to download the network-based video, initiating a process to download the network-based video from the initial source, monitoring progress of the download of the network-based video from the initial source, determining that an estimated time remaining for the download of the network-based video from the initial source to complete does not enable viewing of the network-based video without interruption, selecting an alternative source from which to download at least a portion of the network-based video, and initiating a second process to download at least the portion of the network-based video from the alternate source.

In further detail, when the process 2500 begins, a network-based video scheduled to be played at a particular time is identified (2502). For example, a video scheduled to be played at 5 p.m. may be identified. As another example, a video such as one of the IP videos "2" through "7" described by content entries 2306a-g (see FIG. 23A) may be identified.

After a network-based video has been identified, multiple sources from which the network-based video is available for downloading are identified (2504). For example, a video may be available for downloading from a PNS (e.g., using the Internet) and from a CDN.

An initial source from which to download the network-based video is selected (2506). For example, a PNS may be selected as an initial source when the time remaining until the particular time at which the network-based video is scheduled to be played exceeds an estimated download time of the network-based video from the PNS.

A process is initiated to download the network-based video from the initial source (2508). For example, if the initial source is a PNS, a connection may be made with an Internet server (e.g., Youtube), and a download process may be initiated to download the video. The video may be downloaded, for example, to an Internet DMA (Digital Media Adapter).

Progress of the download of the network-based video from the initial source is monitored (2510). For example, an amount of time remaining until the particular time at which the network-based video is scheduled to be played may be determined, and it may be determined whether the estimated amount of time remaining for the download of the network-based video from the initial source to complete exceeds the amount of time remaining until the particular time at which the network-based video is scheduled to be played.

If the estimated amount of time remaining for the download of the network-based video from the initial source to complete exceeds the amount of time remaining until the particular time at which the network-based video is scheduled to be played, it is determined that the estimated time remaining for the download of the network-based video from the initial source to complete does not enable viewing of the network-based video without interruption (2512).

For example, in the previously-discussed FIG. 23A, IP video "2" is scheduled to be played at 5 p.m. At 4 p.m., an estimated amount of time remaining for the download of IP video "2" to complete from a PNS is computed as 30 minutes. At 4 p.m., the amount of time remaining until IP video "2" is scheduled to be played is 60 minutes. The 30-minute download time does not exceed the 60-minute time remaining until IP video "2" is scheduled to be played, so IP video "2" may be downloaded from the PNS and IP video "2" may be viewed at 5 p.m. without interruption.

In contrast, in the previously-discussed FIG. 23B, at 4:15 p.m., an estimated amount of time remaining for the download of IP video "4" is computed as 50 minutes. At 4:15 p.m., the amount of time remaining until IP video "4" is scheduled to be played is 45 minutes. The 50-minute download time exceeds the 45-minute time remaining until IP video "4" is scheduled to be played, so IP video "4", in this example, cannot be downloaded from the PNS for viewing at 5 p.m. without interruption.

In response to determining that the estimated amount of time remaining for the download of the network-based video from the initial source to complete does not enable viewing of the network-based video at the particular time without interruption, an alternative source from which to download at least a portion of the network-based video is selected (2514). For example, a CDN may be selected to download at least a portion of the network-based video. Referring to FIG. 23B, a CDN may be selected to download at least a portion of the IP video "4" at 4:15 p.m.

A second process is initiated to download at least the portion of the network-based video from the alternate source (2516). For example, referring to FIG. 23B, at least a portion of the IP video "4" may be downloaded from the CDN. In some implementations, a remaining portion of the network-based video that has not been downloaded from the initial source is identified. A second process may be initiated to download the remaining portion of the network-based video from the alternative source. The initial portion of the network-based video downloaded from the initial source may be combined with the remaining portion of the network-based video downloaded from the alternative source. The combined initial portion and remaining portion may be stored in electronic storage associated with the media system. The media system may be controlled to play the network-based video at the particular time using the combined initial portion and remaining portion of the network-based video. In some implementations, the entire network-based video may be downloaded from the alternative source.

Figure 26:
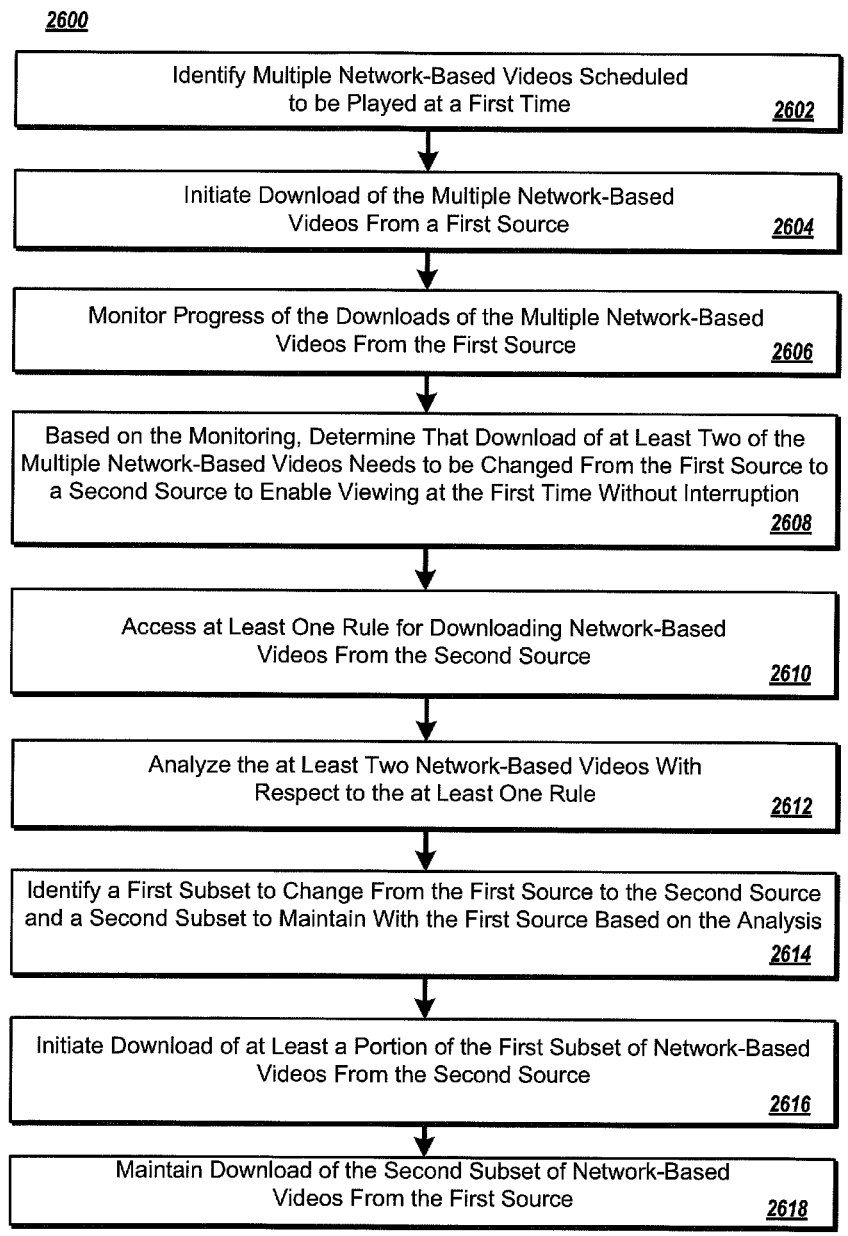

FIG. 26 is a flowchart illustrating a computer-implemented process 2600 for downloading content for viewing using a media system. Briefly, the computer-implemented process 2600 includes: identifying multiple network-based videos scheduled to be played at a first time; initiating download of the multiple network-based videos from a first source; monitoring progress of the downloads of the multiple network-based videos from the first source; based on the monitoring, determining that download of at least two of the multiple network-based videos need to be changed from the first source to a second source, to enable viewing at the first time without interruption; accessing at least one rule for downloading network-based videos from the second source; analyzing the at least two network-based videos with respect to the at least one rule; identifying a first subset to change from the first source to the second source and a second subset to maintain with the first source, based on the analysis; initiating download of at least a portion of the first subset of network-based videos from the second source; and maintaining download of the second subset of network-based videos from the first source.

In further detail, when the process 2600 begins, multiple network-based videos scheduled to be played at a first time are identified (2602). For example, referring to FIG. 23A, IP videos "2" through "6" scheduled to be played at 5 p.m. may be identified.

After videos have been identified, download of the multiple network-based videos from a first source is initiated (2604). For example, download of the multiple network-based videos may be initiated from a PNS without incurring a charge.

Progress of the downloads of the multiple network-based videos from the first source is monitored (2606). For example, as discussed above with respect to FIG. 25, estimated amounts of download time remaining for each video may be compared to time remaining until the network videos are scheduled to be played.

Based on the monitoring, it may be determined that download of at least two of the multiple network-based videos need to be changed from the first source to a second source to enable viewing at the first time without interruption (2608). For example, for each of at least two videos, an estimated amount of download time remaining from the first source may exceed the time remaining until the corresponding video is scheduled to be played. In this example, download of the at least two videos may need to be changed to a faster service, such as to a CDN that charges for downloads, to enable viewing at the first time without interruption.

At least one rule is accessed for downloading network-based videos from the second source (2610). For example, a rule may define a number (e.g., 5) of network-based videos that may be downloaded from the second source during a particular time frame. For example, users may have a monthly quota or monthly cost limit of downloads based on a customer agreement. As another example, a rule may define criteria used for selecting network-based videos to prioritize when downloading from the second source. For example, a rule may prioritize downloading videos from the second source based on longer remaining download times, historical viewing patterns of a user, or whether alternative content is unavailable.

After one or more rules are accessed, the at least two network-based videos are analyzed with respect to the at least one rule (2612). For example, for a rule which defines a number of network-based videos that may be downloaded from the second source during a particular time frame, it may be determined that downloading all of the at least two network-based videos from the second source would result in exceeding the number of network-based videos that may be downloaded from the second source during the particular time frame. A number of network-based videos that have been downloaded from the second source during the particular time frame may be tracked, and a service level of a user may be determined for which the multiple network-based videos are scheduled to be played.

The number of network-based videos that may be downloaded from the second source during the particular time frame may be adjusted based on the service level of the user. For example, if a user is allowed to download two videos during a particular timeframe, and if one video has already been downloaded during the timeframe, and if a total of three videos were to be downloaded during the timeframe, the count of three videos to download during the timeframe may be adjusted to two videos in total (e.g., one more additional download) to avoid exceeding the number of network-based videos that may be downloaded from the second source during the particular time frame.

When the tracked number of network-based videos that have been downloaded from the second source during the particular time frame reaches the number of network-based videos that may be downloaded from the second source during the particular time frame, a message may be provided to the user indicating that the user may increase the service level to increase the number of network-based videos that may be downloaded from the second source during the particular time frame. The user may be enabled to, in response to the message, electronically increase the service level using the media system. The message may be displayed, for example, on a display screen included in the media system. The user may respond to the message, for example, by pressing buttons on a remote control device. The increase of a service level may correspond to an increase in a service fee.

After rules are analyzed, a first subset to change from the first source to the second source and a second subset to maintain with the first source are identified, based on the analysis (2614). For example, for a rule which prioritizes downloading from the second source based on longer remaining download times, a first subset of videos may be identified which includes videos having longer estimated remaining download times, and a second subset of videos may be identified which includes videos having shorter estimated download times.

As another example, for a rule which prioritizes downloading from the second source based on historical viewing patterns, a first subset of videos may be identified which includes videos which, based on historical viewing patterns, are more likely to be selected by the user at the particular time, and a second subset of videos may be identified which includes videos which, based on historical viewing patterns, are less likely to be selected by the user at the particular time. For example, a user may have historically selected, during particular times of day, a certain type of content, such as crime drama, more often than other types of content, such as comedy.

For rules which limit downloads based on a cost limit, a first subset of videos may be identified which maximizes the number of downloads from the second source without exceeding a cost limit. For example, a user may have $5 remaining to spend on downloads, and potential videos to download from a CDN may cost $2, $3, and $4, respectively. A $2 video and a $3 video may be identified as being included in a first subset, and a $4 video may be identified as being included in a second subset.

Subsets of videos may be identified based on a potential to rearrange content. For example, if a first video with a potentially long download time is followed on a meta-channel by a second video with a short download time, the order of presentation of the second and first videos may be reversed and the first video may be included in a subset of videos to be downloaded by a PNS (e.g., the first video may continue to be downloaded while the second video plays). Depending on the time remaining until the first video was scheduled to be played, the second video may be included in either a subset of videos to be downloaded from a PNS, or a subset of videos to be downloaded from a CDN. As another example, a video which is followed on a meta-channel by a live broadcast may be identified as being included in a first subset of videos to be downloaded from a CDN (e.g., since the live broadcast content might not be able to be rearranged).

After first and second subsets are identified, download is initiated of at least a portion of the first subset of network-based videos from the second source (2616). For example, download of at least a portion of the first subset of videos from a CDN may be initiated. Download of the second subset of network-based videos from the first source is maintained (2618). For example, download of the second subset of videos may be maintained as downloading from a PNS.

Figure 27:
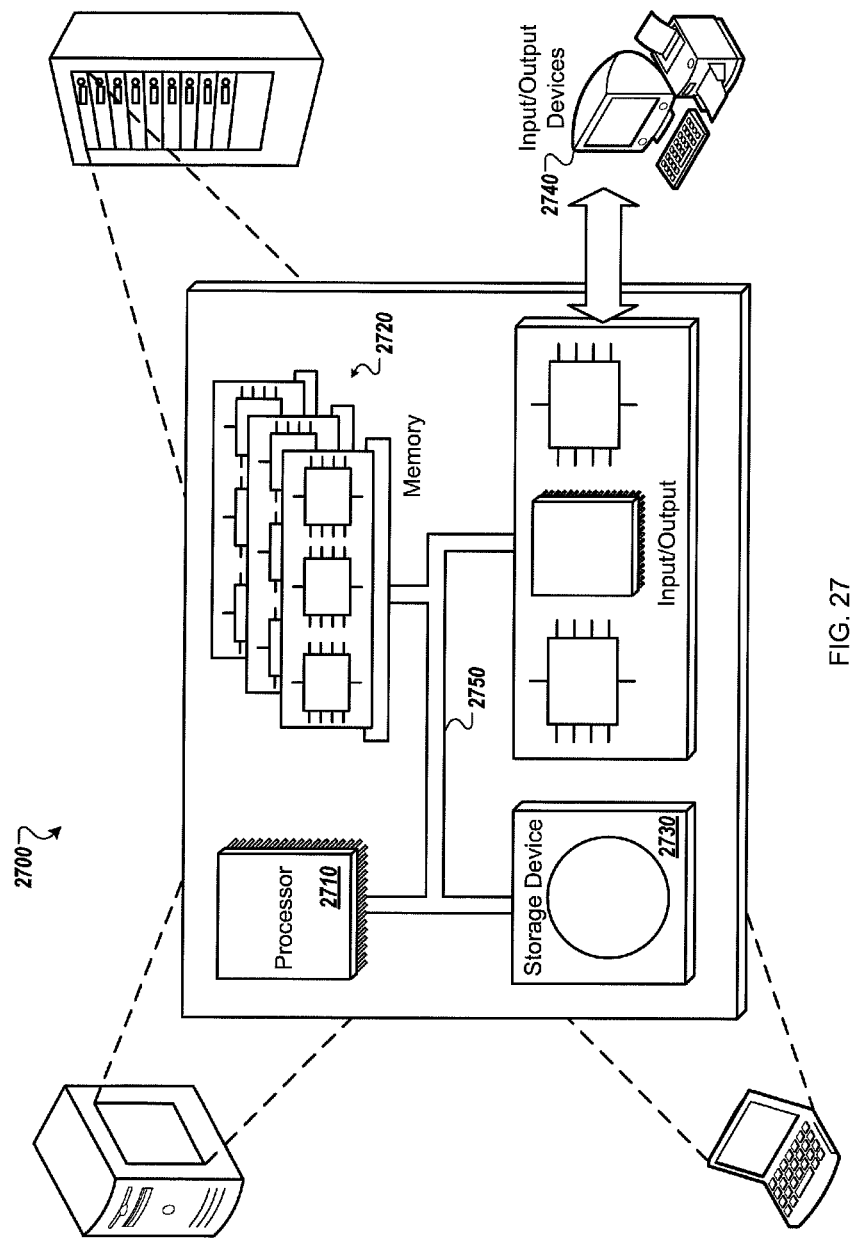
FIG. 27 illustrates components of an exemplary computer processing system.

FIG. 27 is a schematic diagram of an example of a generic computer system 2700. The system 2700 includes a processor 2710, a memory 2720, a storage device 2730, and an input/output device 2740. Each of the components 2710, 2720, 2730, and 2740 are interconnected using a system bus 2750.

The processor 2710 is capable of processing instructions for execution within the system 2700. In one implementation, the processor 2710 is a single-threaded processor. In another implementation, the processor 2710 is a multi-threaded processor. The processor 2710 is capable of processing instructions stored in the memory 2720 or on the storage device 2730 to display graphical information for a user interface on the input/output device 2740.

The memory 2720 stores information within the system 2700. In one implementation, the memory 2720 is a computer-readable medium. In another implementation, the memory 2720 is a volatile memory unit. In yet another implementation, the memory 2720 is a non-volatile memory unit.

The storage device 2730 is capable of providing mass storage for the system 2700. In one implementation, the storage device 2730 is a computer-readable medium. In various different implementations, the storage device 2730 may be a floppy disk device, a hard disk device, an optical disk device, or a tape device.

The input/output device 2740 provides input/output operations for the system 2700. In one implementation, the input/output device 2740 includes a keyboard and/or pointing device. In another implementation, the input/output device 2740 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope of the disclosure. Accordingly, other implementations are within the scope of the following claims.

What is claimed is:

1. A method of enabling a media system to render content, the method comprising:

storing, in first electronic storage, meta-channel information defining multiple meta-channels that identify content entries and that indicate an order with which to experience the content entries;

accessing, from the meta-channel information stored in the first electronic storage, content entries corresponding to content defined by each of the multiple meta-channels, the accessed content entries including at least one content entry that relates to a first type of content and at least one content entry that relates to a second type of content;

based on the accessed content entries, identifying a type of content defined by each of the multiple meta-channels;

based on the identified type of content defined by each of the multiple meta-channels, selecting a subset of the multiple meta-channels, the selected subset of meta-channels each defining the second type of content;

storing, in second electronic storage associated with a media system of a user, a decoded version of the content defined by each of the meta-channels included in the selected subset of meta-channels; and in response to selection, by the user, of one of the meta-channels included in the selected subset of meta-channels, controlling the media system to render content defined by the selected meta-channel using the decoded version of the content stored in the second electronic storage associated with the media system of the user,
wherein selecting the subset of the multiple meta-channels comprises:
identifying a first meta-channel included in the multiple meta-channels that defines a first Internet video;
determining that the first Internet video is ready for viewing in a first time that is less than a threshold time;
identifying a second meta-channel included in the multiple meta-channels that defines a second Internet video;
determining that the second Internet video is ready for viewing in a second time that is more than the threshold time; and
based on the determination that the first Internet video is ready for viewing in the first time that is less than the threshold time and the determination that the second Internet video is ready for viewing in the second time that is more than the threshold time, including the second meta-channel in the selected subset of the multiple meta-channels while excluding the first meta-channel from the selected subset of the multiple meta-channels.

2. The method of claim 1 wherein controlling the media system comprises controlling the media system to render content defined by the selected meta-channel using the decoded version of the content stored in the second electronic storage, whereby using the decoded version enables a channel switching time for switching to the selected meta-channel to be comparable to a channel switching time for switching to a meta-channel the defines the first type of content, which is content broadcast by a content provider at a specific time.

3. The method of claim 1 wherein:
controlling the media system comprises controlling the media system to render content defined by the selected meta-channel using the decoded version of the content stored in the second electronic storage, whereby using the decoded version enables a channel switching time for switching to the selected meta-channel to be less than half a second; and
controlling the media system to render content defined by the selected meta-channel without using the decoded version of the content stored in the second electronic storage results in a channel switching time for switching to the selected meta-channel that is greater than half a second.

4. The method of claim 1 wherein controlling the media system comprises:
initially using the decoded version of the content stored in the second electronic storage to render the content defined by the selected meta-channel;
triggering a process to render an original version, other than the decoded version, of the content defined by the selected meta-channel, the process to render the original version of the content defined by the selected meta-channel having a longer delay to begin rendering of the content than initially using the decoded version of the content; and
when the original version of the content defined by the selected meta-channel is ready for rendering, transitioning from using the decoded version of the content to using the original version of the content.

5. The method of claim 4 wherein transitioning from using the decoded version of the content to using the original version of the content comprises:

identifying an amount of content that has been rendered using the decoded version of the content;
identifying a transition point in the original version of the content that corresponds to the amount of content that has been rendered using the decoded version of the content; and
beginning using the original version of the content at the transition point to enable smooth transition from the decoded version of the content to the original version of the content.

6. The method of claim 4 wherein triggering the process to render the original version, other than the decoded version, of the content defined by the selected meta-channel comprises decoding the original version of the content defined by the selected meta-channel using a video codec.

7. The method of claim 6 wherein triggering the process to render the original version, other than the decoded version, of the content defined by the selected meta-channel further comprises:
sending, over a network, a request to a content provider serving the original version of the content defined by the selected meta-channel; and
downloading, over the network from the content provider, the original version of the content defined by the selected meta-channel.

8. A method of enabling a media system to render content, the method comprising:
storing, in first electronic storage, meta-channel information defining multiple meta-channels that identify content entries and that indicate an order with which to experience the content entries;
accessing, from the meta-channel information stored in the first electronic storage, content entries corresponding to content defined by each of the multiple meta-channels for a particular time frame, the accessed content entries including at least one content entry that relates to a first type of content broadcast by a content provider at a specific time and at least one content entry that relates to a second type of content made available, over a network, by a content provider in response to user requests;
based on the accessed content entries, identifying a type of content defined by each of the multiple meta-channels for the particular time frame;
based on the identified type of content defined by each of the multiple meta-channels for the particular time frame, selecting a subset of the multiple meta-channels, the selected subset of meta-channels each defining, for the particular time frame, the second type of content made available, over a network, by a content provider in response to user requests;
storing, in second electronic storage associated with a media system of a user, a decoded version of the content defined for the particular time frame by each of the meta-channels included in the selected subset of meta-channels; and
in response to selection, by the user during the particular time frame, of one of the meta-channels included in the selected subset of meta-channels, controlling the media system to render content defined by the selected meta-channel using the decoded version of the content stored in the second electronic storage associated with the media system of the use,
wherein selecting the subset of the multiple meta-channels comprises:
identifying the multiple meta-channels that define, for the particular time frame, the second type of content made available, over a network, by a content provider in response to user requests and for which a time needed to begin rendering content defined by the meta-channel without storing, in the second electronic storage associated with the media system of the user, a decoded version of the content exceeds a threshold time;

for each of the identified meta-channels, determining an amount of content needed to be stored, in the second electronic storage associated with the media system of the user, to enable transition from using a decoded version of the content to using an original version of the content without a break in content rendering;

determining whether the second electronic storage associated with the media system of the user has the ability to store the determined amount of content for each of the identified meta-channels prior to the particular time frame;

conditioned on determining that the second electronic storage associated with the media system of the user has the ability to store the determined amount of content for each of the identified meta-channels prior to the particular time frame, selecting all of the identified meta-channels as the subset of the multiple meta-channels; and conditioned on determining that the second electronic storage associated with the media system of the user does not have the ability to store the determined amount of content for each of the identified meta-channels prior to the particular time frame, selecting a subset of the identified meta-channels as the subset of the multiple meta-channels.

9. The method of claim 8 wherein determining whether the second electronic storage associated with the media system of the user has the ability to store the determined amount of content for each of the identified meta-channels prior to the particular time frame comprises determining whether the amount of content for the identified meta-channels exceeds an amount of available storage in the second electronic storage associated with the media system of the user.

10. The method of claim 8 wherein determining whether the second electronic storage associated with the media system of the user has the ability to store the determined amount of content for each of the identified meta-channels prior to the particular time frame comprises determining whether an amount of time remaining until a start of the particular time frame exceeds an amount of time needed for the media system to download, decode, and store the determined amount of content for each of the identified meta-channels.

11. The method of claim 8 wherein selecting the subset of the identified meta-channels as the subset of the multiple meta-channels comprises:

identifying combinations of the identified meta-channels for which the second electronic storage associated with the media system of the user has the ability to store, prior to the particular time frame, the determined amount of content for each of the meta-channels included in the combination; and selecting, from among the identified combinations, a combination of the identified meta-channels that includes the highest number of channels.

12. The method of claim 8 wherein selecting the subset of the identified meta-channels as the subset of the multiple meta-channels comprises:

accessing historical viewing patterns that indicate one or more categories of content the user has experienced during past time frames that are similar to the particular time frame;

comparing the content defined by each of the identified meta-channels to the accessed historical viewing patterns;

determining a subset of the identified meta-channels that the user is mostly to experience during the particular time frame based on the comparison of the content defined by each of the identified meta-channels to the accessed historical viewing patterns; and selecting the determined subset of the identified meta-channels.

13. The method of claim 8 wherein selecting the subset of the identified meta-channels as the subset of the multiple meta-channels comprises:

determining a meta-channel being experienced by the user at the time of selecting;

accessing information that identifies one or more meta-channels the user typically selects subsequent to experiencing the meta-channel being experienced by the user at the time of selecting;

comparing the accessed information to the identified meta-channels;

determining a subset of the identified meta-channels that the user is most likely to experience during the particular time frame based on the comparison of the accessed information to the identified meta-channels; and selecting the determined subset of the identified meta-channels.

14. The method of claim 1 wherein selecting the subset of the multiple meta-channels comprises selecting a plurality of the multiple meta-channels.

15. The method of claim 14 wherein selecting the plurality of the multiple meta-channels comprises:

selecting a first meta-channel that defines a first Internet video; and selecting a second meta-channel that defines a second Internet video, the second meta-channel being different than the first meta-channel and the second Internet video being different than the first Internet video.

16. The method of claim 15 wherein storing a decoded version of the content defined by each of the meta-channels included in the selected subset of meta-channels comprises:

determining a portion of the first Internet video to store based on time needed to render the first Internet video without caching, the portion of the first Internet video being less than all of the first Internet video;

caching a decoded version of the determined portion of the first Internet video prior to rendering;

determining a portion of the second Internet video to store based on time needed to render the second Internet video without caching, the portion of the second Internet video being less than all of the second Internet video and being larger than the portion of the first Internet video; and caching a decoded version of the determined portion of the second Internet video prior to rendering.

17. The method of claim 16, further comprising:

determining that a particular time frame related to rendering the first Internet video and the second Internet video has passed; and based on the determination that the particular time frame has passed, removing, from the second electronic storage device, the decoded version of the determined portion of the first Internet video and the decoded version of the determined portion of the second Internet video.

18. The method of claim 17 wherein at least one of the decoded version of the determined portion of the first Internet video and the decoded version of the determined portion of the second Internet video is removed without having been rendered by the media system.

19. A method of enabling a media system to render content, the method comprising:

storing, in first electronic storage, meta-channel information defining multiple meta-channels that identify content entries and that indicate an order with which to experience the content entries;

accessing, from the meta-channel information stored in the first electronic storage, content entries corresponding to content defined by each of the multiple meta-channels, the accessed content entries including at least one content entry that relates to a first type of content and at least one content entry that relates to a second type of content;

based on the accessed content entries, identifying a type of content defined by each of the multiple meta-channels;

based on the identified type of content defined by each of the multiple meta-channels, selecting a subset of the multiple meta-channels, the selected subset of meta-channels each defining the second type of content;

storing, in second electronic storage associated with a media system of a user, a decoded version of the content defined by each of the meta-channels included in the selected subset of meta-channels; and in response to selection, by the user, of one of the meta-channels included in the selected subset of meta-channels, controlling the media system to render content defined by the selected meta-channel using the decoded version of the content stored in the second electronic storage associated with the media system of the user, wherein selecting the subset of the multiple meta-channels comprises:

determining that it is not possible to cache portions of all Internet videos scheduled for rendering; and based on the determination that it is not possible to cache portions of all Internet videos scheduled for rendering, selecting meta-channels corresponding to a subset of the Internet videos scheduled for rendering.

20. The method of claim 19 wherein determining that it is not possible to cache portions of all Internet videos scheduled for rendering comprises determining that the second electronic storage device associated with the media system of the user does not have enough space to store portions of all Internet videos scheduled for rendering.

21. The method of claim 19 wherein determining that it is not possible to cache portions of all Internet videos scheduled for rendering comprises determining that, between a current time and a particular time frame at which the Internet videos are scheduled to be rendered, insufficient time exists to download and transcode portions of all Internet videos scheduled for the particular time frame.

22. The method of claim 19, further comprising:

detecting ending of at least a portion of a first Internet video included in the subset of the Internet videos cached in the second electronic storage device associated with the media system of the user;

clearing the portion of the first Internet video from the second electronic storage device associated with the media system of the user;

in response to the clearing of the portion of the first Internet video from the second electronic storage device associated with the media system of the user:

selecting a new meta-channel that was not previously selected and that defines a previously-uncached Internet video; and caching at least a portion of the previously-uncached Internet video.

23. The method of claim 22:

wherein detecting ending of at least a portion of the first Internet video in the subset of the Internet videos cached in the second electronic storage device associated with the media system of the user comprises detecting ending of the portion of the first Internet video; and wherein clearing the portion of the first Internet video from the second electronic storage device associated with the media system of the user comprises clearing the portion of the first Internet video even though an original version of the first Internet video is still being rendered by the media system.

\* \* \* \* \*